(12) United States Patent
Li et al.

(10) Patent No.: US 11,622,507 B2
(45) Date of Patent: Apr. 11, 2023

(54) HEDGE TRIMMER

(71) Applicant: Nanjing Chervon Industry Co., Ltd., Nanjing (CN)

(72) Inventors: Li Li, Nanjing (CN); Hekun Wu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/161,826

(22) Filed: Jan. 29, 2021

(65) Prior Publication Data
US 2021/0144929 A1 May 20, 2021

Related U.S. Application Data

(63) Continuation of application No. PCT/CN2019/073396, filed on Jan. 28, 2019.

(30) Foreign Application Priority Data

Sep. 7, 2018 (CN) .......................... 201811044158.3

(51) Int. Cl.
*A01G 3/053* (2006.01)
*A01G 3/04* (2006.01)
(Continued)

(52) U.S. Cl.
CPC ............. *A01G 3/037* (2013.01); *A01G 3/053* (2013.01); *A01G 3/08* (2013.01); *A01G 2003/0461* (2013.01)

(58) Field of Classification Search
CPC .................. A01G 3/053; A01G 3/0535; A01G 2003/0461
(Continued)

(56) References Cited

U.S. PATENT DOCUMENTS 5,138,908 A 8/1992 Raetz et al.
5,271,154 A * 12/1993 Ohkanda ............... B23D 49/006
30/216
(Continued)

FOREIGN PATENT DOCUMENTS

CN 103477878 A 1/2014
CN 204498877 U 7/2015
(Continued)

OTHER PUBLICATIONS

ISA/CN, Int. Search Report issued on PCT application No. PCT/CN2019/073396, dated Apr. 26, 2019, 3 pages.
(Continued)

*Primary Examiner* — Laura M Lee
(74) *Attorney, Agent, or Firm* — Greenberg Traurig, LLP

(57) ABSTRACT

A hedge trimmer includes a blade assembly having a first blade and a second blade, a housing, a prime mover, and a transmission device. The first blade includes a first body portion and a plurality of first tooth portions, and the second blade includes a second body portion and a plurality of second tooth portions. The first blade includes a first connection assembly including a first driving portion and a first connecting portion, and the second blade includes a second connection assembly including a second driving portion and a second connecting portion. The first connecting portion and the first body portion form a detachable connection, the second connecting portion and the second body portion form a detachable connection, and the first connecting portion is at least partially located outside the housing.

18 Claims, 14 Drawing Sheets

(51) Int. Cl.
*A01G 3/037* (2006.01)
*A01G 3/08* (2006.01)

(58) Field of Classification Search
USPC .......................................... 30/355, 369, 216
See application file for complete search history.

(56) References Cited

U.S. PATENT DOCUMENTS

| | | | | |
|---|---|---|---|---|
| H1428 H | * | 4/1995 | Ohkanda | 30/223 |
| 5,640,837 A | * | 6/1997 | Ueyama | A01G 3/053 56/307 |
| 5,987,753 A | * | 11/1999 | Nagashima | A01G 3/053 30/223 |
| 6,263,579 B1 | * | 7/2001 | Nagashima | A01G 3/053 30/223 |
| 7,788,811 B2 | * | 9/2010 | Hanada | A01G 3/053 74/567 |
| 10,892,449 B2 | * | 1/2021 | Yamaoka | H01M 50/256 |
| D910,388 S | * | 2/2021 | Tucker | D8/8 |
| 2008/0134521 A1 | * | 6/2008 | Hanada | A01G 3/053 30/277.4 |
| 2011/0047952 A1 | * | 3/2011 | Matsuo | A01G 3/053 56/297 |
| 2013/0326885 A1 | * | 12/2013 | Kaupp | A01G 3/053 30/208 |
| 2019/0338839 A1 | * | 11/2019 | Hanada | A01G 3/053 |
| 2021/0195845 A1 | * | 7/2021 | Sunazuka | A01G 3/053 |

FOREIGN PATENT DOCUMENTS

| | | |
|---|---|---|
| CN | 204968659 U | 1/2016 |
| CN | 206611827 A | 11/2017 |
| CN | 207269417 U | 4/2018 |
| JP | H078067 A | 1/1995 |
| JP | H0928150 A | 2/1997 |
| JP | H09238533 A | 9/1997 |
| JP | 4526914 B2 | 8/2010 |

OTHER PUBLICATIONS

EPO, extended European search report issued on European patent publication No. 3821697, dated Jul. 27, 2021, 3 pages.

* cited by examiner

HEDGE TRIMMER

RELATED APPLICATION INFORMATION

The present application is a continuation of International Application Number PCT/CN2019/073396, filed on Jan. 28, 2019, through which this application also claims the benefit of Chinese Patent Application No. 201811044158.3 filed on Sep. 7, 2018, which applications are incorporated herein by reference in their entirety.

BACKGROUND

A hedge trimmer is a gardening tool widely used for trimming or pruning shrubs, hedges and other vegetation.

A hedge trimmer generally includes: a housing, a prime mover, a transmission device, and a blade assembly, wherein the prime mover and the transmission device are arranged in the housing. A part of the blade assembly is located in the housing, and another part extends forward outside the housing. The housing includes a body and a maintenance cover. The maintenance cover is arranged on the lower side of the body. When the maintenance cover is connected to the body, an accommodating cavity is formed around the prime mover and the transmission device. The blade assembly is partially arranged inside the accommodating cavity. The maintenance cover and the body are generally connected by a plurality of screws, and the number of screws required for installing the maintenance cover is generally 6 to 8. The blade assembly includes: a first blade, a second blade, and a support bar. The first blade and the second blade are installed to the support bar by a plurality of screws. The number of screws required for installing the first blade and the second blade is generally 6 to 10.

As the blade assembly gets severely worn during repeated cutting, an operator needs to frequently replace the blade assembly. For existing hedge trimmers, when replacing the blade assembly, the operator needs to disassemble the maintenance cover first, and then disassemble the first blade and the second blade from the support bar. During the entire disassembly process, the operator generally needs to unscrew 12 to 18 screws. It generally takes about 20 seconds to remove one screw. So it takes 4 to 10 minutes to unscrew the screws. Then the operator needs to install the new first blade and the new second blade. The entire disassembly and assembly process takes about 20 minutes to half an hour, which seriously reduces the operator's work efficiency. Moreover, removing the maintenance cover to expose the transmission device is likely to change the position of various parts in the transmission device, which further extends the time required for replacing the blade assembly and may even reduce the stability of the transmission device. Furthermore, replacing the entire first blade and the second blade can dramatically increase the usage cost of the operator.

SUMMARY

In one example of the disclosure, a hedge trimmer includes: a blade assembly including a first blade and a second blade that perform a cutting function with relative motion; a housing formed with an accommodating cavity; a prime mover arranged inside the accommodating cavity; and a transmission device for realizing power transmission between the prime mover and the blade assembly to drive the first blade and the second blade to produce the relative motion. The first blade includes: a first body portion extending along a first straight line; and a plurality of first tooth portions configured to cut vegetation. The second blade includes: a second body portion extending along a second straight line; and a plurality of second tooth portions configured to cut vegetation. The first blade further includes: a first connection assembly including a first driving portion connected with the transmission device to introduce a driving force output by the transmission device into the first blade and a first connecting portion connected with the first body portion to make the first body portion move with the first driving portion. The second blade further includes: a second connection assembly including a second driving portion connected with the transmission device to introduce a driving force output by the transmission device into the second blade and a second connecting portion connected with the second body portion to make the second body portion move with the second driving portion. Wherein, the first connecting portion and the first body portion form a detachable connection, and the second connecting portion and the second body portion form a detachable connection.

In one example, the first connecting portion is at least partially located outside the housing.

In one example, the hedge trimmer further includes: a stopper enabled to restrict the first body portion from being detached from the first connecting portion and restrict the second body portion from being detached from the second connecting portion, the stopper having a limiting state and an unlocked state; when the stopper is in the limiting state, the stopper prevents the first body portion from being detached from the first connecting portion and prevents the second body portion from being detached from the second connecting portion; when the stopper is in the unlocked state, the stopper allows the first body portion to be detached from the first connecting portion and allows the second body portion to be detached from the second connecting portion.

In one example, the hedge trimmer further includes: a stopper enabled to restrict the first body portion from being detached from the first connecting portion; the stopper has a limiting state that restricts the first body portion from being detached from the first connecting portion, and an unlocked state that allows the first body portion to be detached from the first connecting portion; the stopper is partially located inside the housing, and the stopper further includes an operating portion, which is at least partially operable by an operator without opening the housing.

In one example, a ratio of a size of the portion of the first connecting portion protruding outside the housing in the first straight line to a size of the first body portion along the first straight line is greater than 0 and less than or equal to 0.5.

In one example, the first body portion and the first connecting portion form a detachable connection along a direction perpendicular to the first straight line; the second body portion and the second connecting portion form a detachable connection along a direction perpendicular to the second straight line.

In one example, the first body portion extends in a first plane, the first connecting portion extends in a second plane, and the first plane and the second plane are parallel and do not overlap; the second body portion extends in a third plane, the second connecting portion extends in a fourth plane, and the third plane and the fourth plane are parallel and do not overlap.

In one example, a height difference exists at a connection point between the first body portion and the first connecting portion, and a height difference exists at a connection point between the second body portion and the second connecting portion.

In one example, the first driving portion and the first connecting portion are integrally formed by one part; the second driving portion and the second connecting portion are integrally formed by one part.

In one example, the first driving portion and the first connecting portion are respectively formed by two different parts; the second driving portion and the second connecting portion are respectively formed by two different parts.

In one example, the first connecting portion is formed with a connecting hole, and the first body portion is formed or connected with a connecting member for inserting into the connecting hole.

In one example, the first connecting portion is formed or connected with a connecting member, and the first body portion is formed with a mating hole for inserting the connecting member.

In one example, the hedge trimmer further includes: a stopper for restricting the first body portion from being detached from the first connecting portion; the stopper has a limiting state that restricts the first body portion from being detached from the first connecting portion, and an unlocked state that allows the first body portion to be detached from the first connecting portion; the stopper is at least partially located outside the housing; a direction that the first body portion detaches from the first connecting portion is defined to be a first direction; the first blade is arranged on a lower side of the second blade; the stopper prevents the first body portion from being detached from the first connecting portion along the first direction, and the first direction and the first straight line are perpendicular to each other.

In one example, the hedge trimmer further includes screws for positioning the stopper in a locked state, and the number of the screws is less than or equal to 2; the screws is located outside the housing.

In one example, the hedge trimmer further includes a screw for positioning the stopper in a locked state, and the number of the screw is 1.

In one example, the hedge trimmer also includes: a first type of screw passing through the stopper along a third straight line direction perpendicular to the first straight line; a plurality of second type of screws that pass through the first blade and the second blade along a fourth straight line direction perpendicular to the first straight line and do not pass through the stopper; the first body portion is formed with a plurality of mounting holes for the plurality of second type of screws to pass through, and each of the plurality of mounting holes includes a sliding portion that allows the plurality of second type of screws to slide along a direction parallel to the first straight line while preventing the plurality of second type of screws from passing by, and a through hole portion that allows the first body portion to be detached from the plurality of second type of screws in a direction perpendicular to the first straight line.

In one example, a maximum size of the sliding portion in a width direction is smaller than a maximum size of the though hole portion in a width direction.

In one example, each of the plurality of mounting holes is also formed with a guide portion provided at a connection point between the sliding portion and the through hole portion; when assembling the first body portion, the guide portion guides the plurality of second type of screws to sequentially engage with the corresponding plurality of mounting holes; when disassembling the first body portion, the guide portion guides the plurality of second type of screws to sequentially disengage with the corresponding plurality of mounting holes.

In one example, a connection point between the first body portion and the first connecting portion is located outside the housing; a connection point between the second body portion and the second connecting portion is located outside the housing.

In one example, the first body portion and the first connecting portion form a detachable connection that is separable without opening the housing.

In one example, the hedge trimmer further includes a stopper for the first body portion in a direction perpendicular to the first straight line; or, the hedge trimmer further includes a stopper for pressing the first connecting portion to the first body portion along a direction perpendicular to the first straight line.

In one example, in a direction perpendicular to the first straight line, the first blade is disposed on the lower side of the second blade; a minimum distance between the first body portion and the housing is greater than or equal to 0 and less than or equal to 300 mm; a minimum distance between the second body portion and the housing is greater than or equal to 0 and less than or equal to 300 mm.

In one example, the first body portion is located outside the housing, and the second body portion is located outside the housing.

In one example, a part of the first connecting portion is located outside the housing, and another part extends into the housing; a part of the second connecting portion is located outside the housing, and another part extends into the housing.

In one example, the first body portion is detachable from the first connecting portion in a direction perpendicular to the first straight line; the stopper is configured to restrict the first body portion from being detached from the pressing plate along a direction perpendicular to the first straight line; a part of the pressing plate is located outside the housing, and another part is located inside the housing.

In one example, the hedge trimmer further includes a support bar for supporting the first blade and the second blade; the pressing plate is fixed to the support bar through a first type of screw, and the number of the first type of screw is less than three; when the first type of screw is removed, the pressing plate is detachable from the housing along a direction parallel to the first straight line.

In one example, the hedge trimmer further includes a plurality of second type of screws for connecting the first body portion and the second body portion to the support bar; the first body portion has at least a first position and a second position along the first straight line with respect to the plurality of second type of screws; when the first body portion is in the first position, the plurality of second type of screws prevent the first body portion from being detached from the support bar; when the first body portion is in the second position, the plurality of second type of screws allow the first body portion to be detached from the support bar.

In one example, the second body portion has at least a third position and a fourth position along the second straight line with respect to the second type of screws; when the second body portion is in the third position, the plurality of second type of screws prevent the second body portion from being detached from the support bar; when the second body portion is in the fourth position, the plurality of second type of screws allow the second body portion to be detached from the support bar.

In one example, the stopper is a pressing plate for restricting the first body portion from being detached from the first connecting portion in a direction perpendicular to the first straight line; the pressing plate is fixed to the blade assembly through a first type of screw; the first type of screw is located outside the housing, when the first type of screw is removed, the pressing plate is detachable from the blade assembly by a user operating from an outside the housing without opening the housing.

In one example, the housing includes a body and a maintenance cover that are detachably connected; when the maintenance cover is disassembled, an internal structure of the housing is at least partially exposed for replacement or maintenance; the first body portion and the first connecting portion form a detachable connection that is separable without disassembling the maintenance cover.

In one example, the first body portion and the second body portion are made of a first material, and the first connecting portion and the second connecting portion are made of a second material different from the first material.

In one example, the hedge trimmer also includes a stopper for pressing the first body portion to the first connecting portion in a direction obliquely intersecting with the first straight line; or, the hedge trimmer further includes a stopper for pressing the first connecting portion to the first body portion in a direction obliquely intersecting with the first straight line.

DETAILED DESCRIPTION

Figure 1:
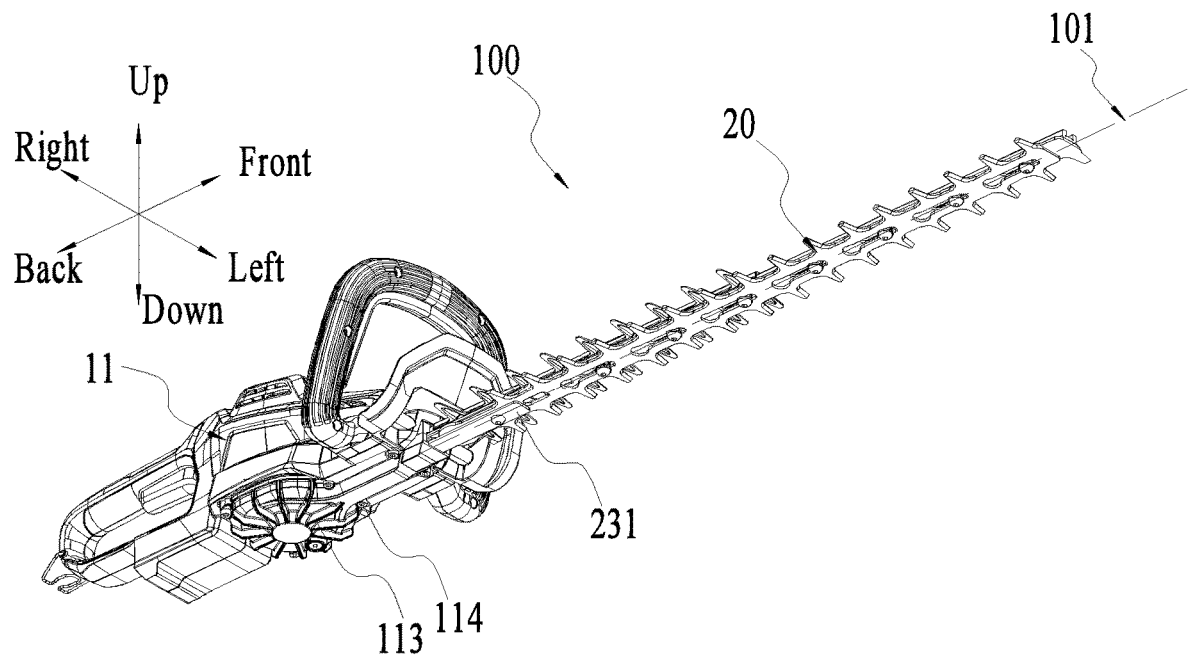
FIG. 1 is a perspective view of the hedge trimmer of the present disclosure according to a first example.

An operator operates a hedge trimmer 100 according to a first example shown in FIG. 1 to cut various shrubs, hedges and other vegetations.

Figure 2:
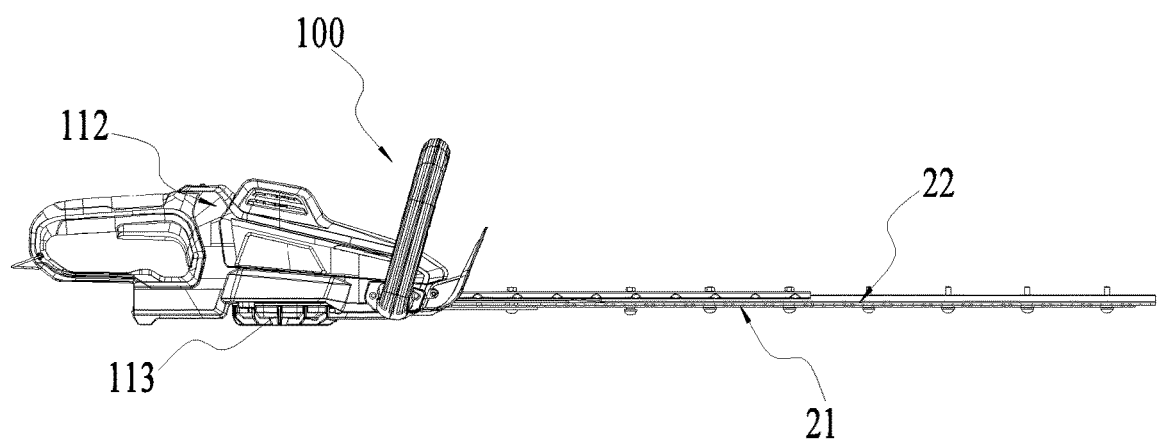
FIG. 2 is a plan view of the hedge trimmer in FIG. 1.
Figure 3:
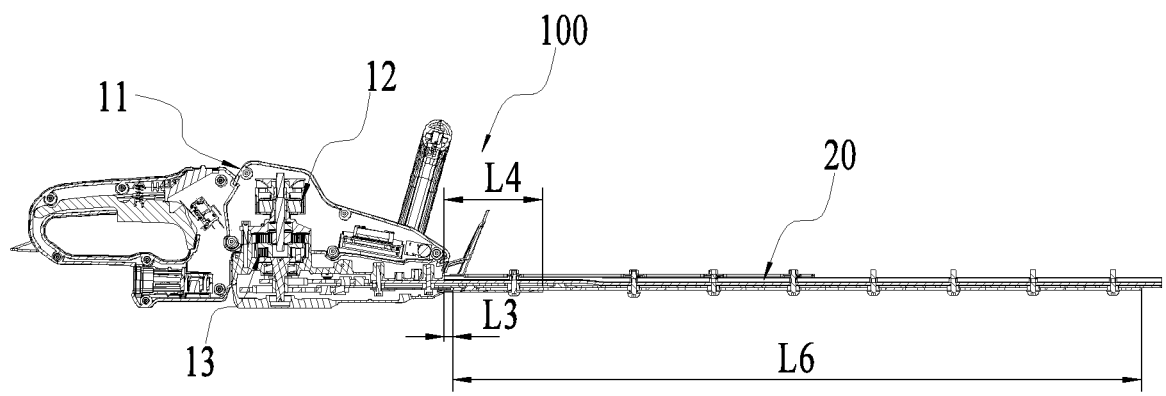
FIG. 3 is a cross-sectional view of the hedge trimmer in FIG. 2.
Figure 4:
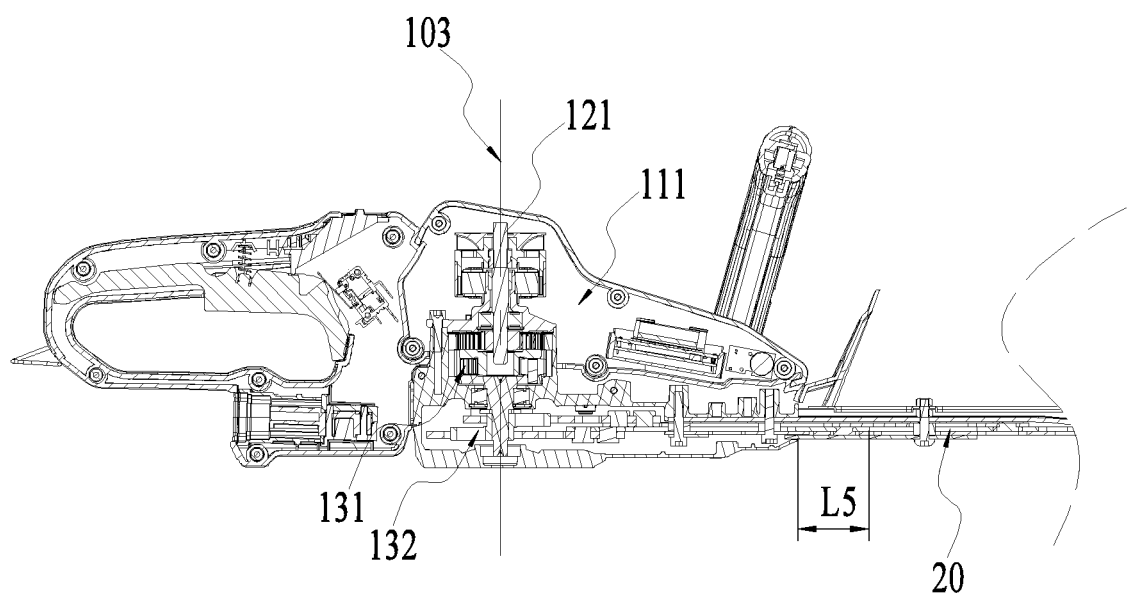
FIG. 4 is an enlarged view of a part of the structure of the hedge trimmer in FIG. 3.
Figure 5:
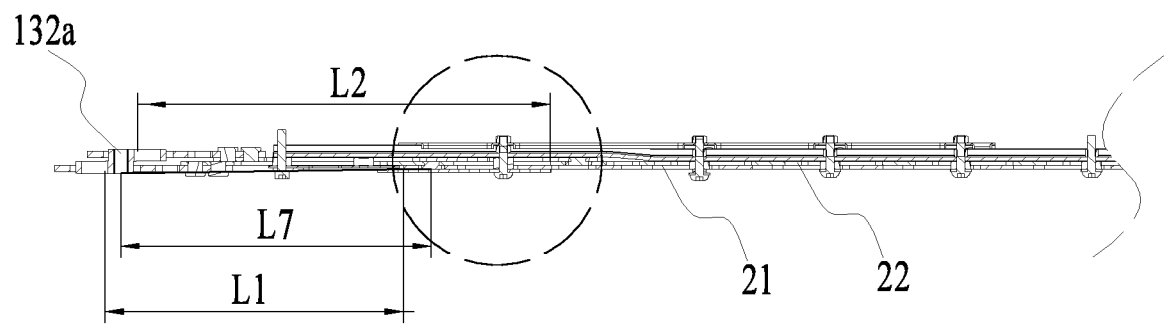
FIG. 5 is a cross-sectional view of a part of the structure of an eccentric assembly and a blade assembly in the hedge trimmer in FIG. 3.
Figure 6:
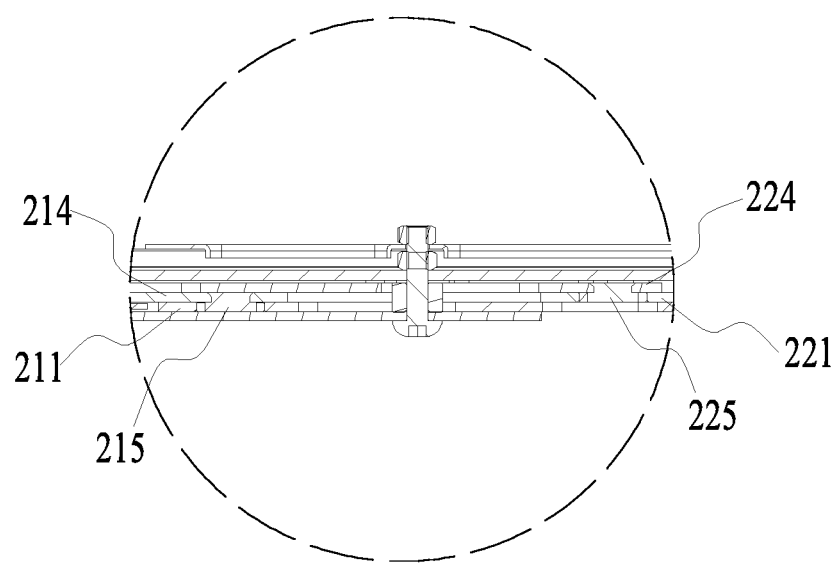
FIG. 6 is an enlarged view of a part of the structure of the blade assembly in FIG. 5.
Figure 7:
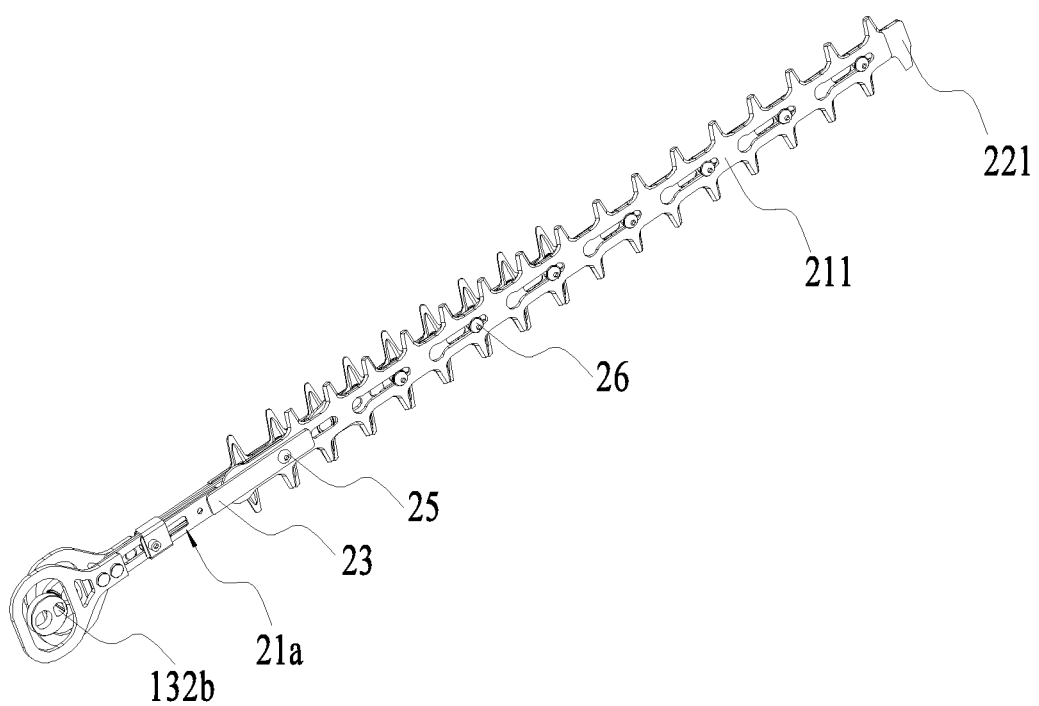
FIG. 7 is a perspective view of the eccentric assembly and the blade assembly in the hedge trimmer of FIG. 2.

As shown in FIGS. 1 and 2, the hedge trimmer 100 includes a housing 11 and a blade assembly 20 at least partially arranged outside the housing 11. As shown in FIGS. 3 and 4, the hedge trimmer 100 further includes: a prime mover 12 and a transmission device 13. The prime mover 12 may specifically be a motor. The blade assembly 20 includes a first blade 21 and a second blade 22 enabled to generate relative motion. As shown in FIGS. 5 to 8, the first blade 21 includes a first body portion 211 extending in a direction of a first straight line 101, and the second blade 22 includes a second body portion 221 extending in a direction of a second straight line 102. When the first blade 21 and the second blade 22 reciprocate relative to each other, the blade assembly 20 is enabled to perform the cutting function. The prime mover 12 is configured to drive the first blade 21 and the second blade 22 to produce relative motion. The prime mover 12 includes a prime mover shaft 121 that can rotate about a prime mover axis 103. The prime mover axis 103 is perpendicular to the first straight line 101. The prime mover axis 103 is also perpendicular to the second straight line 102. The transmission device 13 is configured to realize power transmission between the prime mover 12 and the blade assembly 20 to drive the first blade 21 and the second blade 22 to generate relative motion. The housing 11 encircles an accommodating cavity 111. The prime mover 12 and the transmission device 13 are both arranged in the accommodating cavity 111. A part of the blade assembly 20 is located inside the accommodating cavity 111 and another part is located outside the accommodating cavity 111.

To facilitate the description of the technical solutions of the present disclosure, the directions of up, down, front, back, left, and right are defined by arrows as shown in FIG. 1. In this example, the up, down, left, and right directions are based on the state of the hedge trimmer 100 in FIGS. 1 and 2 as an example.

The housing 11 includes a body 112 and a maintenance cover 113. The body 112 encircles the accommodating cavity 111, and the accommodating cavity 111 surrounded by the body 112 opens downwards. The maintenance cover 113 closes the open portion of the accommodating cavity 111 on the lower side of the body 112 to close the accommodating cavity 111. The maintenance cover 113 can be detachably connected to the body 112 by a plurality of screws 114. When the operator needs to repair an inner structure of the accommodating cavity 111, such as the transmission device 13, the operator can first unscrew the screws 114, and then remove the maintenance cover 113. When the maintenance cover 113 is removed, the accommodating cavity 111 opens downwards, thereby exposing the transmission device 13; at this time, the operator can replace or repair the transmission device 13. The blade assembly 20 extends forward to the outside of the housing 11, so that the blade assembly 20 can cut vegetation.

The transmission device 13 includes a deceleration assembly 131 and an eccentric assembly 132. The deceleration assembly 131 is configured to reduce the rotational speed output by the prime mover 12 to output to the eccentric assembly 132. In this example, the deceleration assembly 131 is a planetary gear train. The eccentric assembly 132 includes: an eccentric member 132a, the eccentric member 132a includes a central hole 132b, a first eccentric portion 132c and a second eccentric portion 132d, the first eccentric portion 132c and the second eccentric portion 132d are respectively arranged eccentrically relative to the central hole 132b, the first eccentric portion 132c is configured to connect with the first blade 21, and the second eccentric portion 132d is configured to connect with the second blade 22. In the front-back direction parallel to the first straight line 101, the first eccentric portion 132c is biased backward relative to the central hole 132b, and the second eccentric portion 132d is biased forward relative to the central hole 132b. In this way, when the decelerating assembly 131 drives the eccentric member 132a to rotate, when the first eccentric portion 132c drives the first blade 21 to move forward, the second eccentric portion 132d drives the second blade 22 to move backward, and when the first eccentric portion 132c drives the first blade 21 to move backward, the second eccentric portion 132d drives the second blade 22 to move forward, so that the movement directions of the first blade 21 and the second blade 22 are opposite, thereby enabling the whole formed by the first blade 21 and the second blade 22 to realize the cutting function.

As shown in FIGS. 5 to 11, the first blade 21 includes: a first body portion 211, a plurality of first tooth portions 212, and a first connection assembly 21a. The first connection assembly 21a includes a first driving portion 213 and a first connecting portion 214. The first body portion 211 extends along the direction of the first straight line 101. The first tooth portions 212 are for cutting vegetation, the number of the first tooth portions 212 is multiple, and the plurality of first tooth portions 212 are respectively disposed on opposite sides in the width direction of the first body portion 211, that is, the plurality of first tooth portions 212 are arranged on both the left and right sides of the first body portion 211. In the present example, the first tooth portions 212 on the left side of the first body portion 211 are mismatched with respect to the first tooth portions 212 on the right side of the first body portion 211. Or, the first tooth portions 212 on the left side of the first body portion 211 and the first tooth portions 212 on the right side of the first body portion 211 are not aligned. In other words, in the direction along the first straight line 101, the first tooth portions 212 on the left side of the first body portion 211 are disposed between two adjacent first tooth portions 212 on the right side. The plurality of first tooth portions 212 and the first body portion 211 are integrally formed. The first driving portion 213 is configured to engage and connect with the first eccentric portion 132c, and the first driving portion 213 is configured to convert the rotation of the first eccentric portion 132c into the reciprocating movement of the first blade 21 along the first straight line 101, thereby introducing the power output by the transmission device 13 to the first blade 21. A first driving hole 213a is formed on the first driving portion 213, and the first eccentric portion 132c is arranged in the first driving hole 213a and enabled to move along the wall of the first driving hole 213a. When the first eccentric portion 132c moves in the first driving hole 213a, it will drive the first driving portion 213 to reciprocate along the direction of the first straight line 101. The first connecting portion 214 is configured to connect the first driving portion 213 and the first body portion 211 so that the first body portion 211 reciprocates along with the first driving portion 213.

The second blade 22 includes a second body portion 221, a plurality of second tooth portions 222, and a second connection assembly 22a. The second connection assembly 22a includes a second driving portion 223 and a second connecting portion 224. The second body portion 221 extends along the direction of the second straight line 102. The second tooth portions 222 are for cutting vegetation, the number of the second tooth portions 222 is multiple, and the plurality of second tooth portions 222 are respectively disposed on opposite sides of the second body portion 221 in the width direction, that is, the plurality of the second tooth portions 222 are arranged on both the left and right sides of the second body portion 221. In the present example, the second tooth portions 222 on the left side of the second body portion 221 are mismatched with respect to the second tooth portions 222 on the right side of the second body portion 221. Or, the second tooth portions 222 on the left side of the second body portion 221 and the second tooth portions 222 on the right side are not aligned. In other words, in the direction along the second straight line 102, the second tooth portion 222 on the left side of the second body portion 221 is disposed between two adjacent second tooth portions 222 on the right side. The second tooth portion 222 and the second body portion 221 are integrally formed. The second driving portion 223 is configured to engage and connect with the second eccentric portion 132d, and the second driving portion 223 is configured to convert the rotation of the second eccentric portion 132d into the reciprocating movement of the second blade 22 along the second straight line 102, thereby introducing the power output by the transmission device 13 to the second blade 22. A second driving hole 223a is formed on the second driving portion 223, and the second eccentric portion 132d is provided in the second driving hole 223a and can move along the wall of the second driving hole 223a. When the second eccentric portion 132d moves in the second driving hole 223a, it will drive the second driving portion 223 to reciprocate along the direction of the second straight line 102. The second connecting portion 224 is configured to connect the second driving portion 223 and the second body portion 221, so that the second body portion 221 reciprocates along with the second driving portion 223.

The distance L1 between the first body portion 211 and the center of the first driving hole 213a is greater than or equal to 80 mm and less than or equal to 500 mm, and the distance L2 between the second body portion 221 and the center of the second driving hole 223a is greater than or equal to 80 mm and less than or equal to 500 mm. Further, the distance L1 between the first body portion 211 and the center of the first driving hole 213a is greater than or equal to 130 mm and less than or equal to 320 mm, and the distance L2 between the second body portion 221 and the center of the second driving hole 223a is greater than or equal to 130 mm and less than or equal to 320 mm. In this way, even if the connection point between the first body portion 211 and the first connecting portion 214 is located inside the housing 11, it is convenient to provide a corresponding window on the housing 11 to separate the first body portion from the first connecting portion 214.

It is understood that, for the blade assembly 20, the first tooth portion 212 and the second tooth portion 222 are relatively prone to wear and becoming dull during the process of repeated vegetation cutting. In this example, the first connecting portion 214 and the first body portion 211 form a detachable connection, and the second connecting portion 224 and the second body portion 221 also form a detachable connection. At least a part of one or both of the first connecting portion 214 and the second connecting portion 224 is located outside the housing 11. In other words, either the first connecting portion 214 is at least partially located outside the housing 11, or the second connecting portion 224 is at least partially located outside the housing 11, or the whole formed by the first connecting portion 214 and the second connecting portion 224 is at least partially located outside the housing 11. In this way, when the first tooth portion 212 or the second tooth portion 222 are worn, the operator can quickly disassemble the first body portion 211 and the second body portion 211 from the outside of the housing 11 without removing the maintenance cover 113 to replace the first body portion 211 and the second body portion 221, which avoids the tedious process of disassembling the maintenance cover 113 to disassemble the internal parts of the housing 11 and then assemble them again, so that the operator can quickly replace the first body portion 211 and the second body portion 221, thereby improving operational convenience. Moreover, the operator does not need to replace the first connection assembly 21a or the second connection assembly 22a when replacing the first tooth portion 212 and the second tooth portion 222, thereby greatly saving the usage cost of the hedge trimmer 100.

Furthermore, in this example, as an implementation approach, the connection point between the first body portion 211 and the first connecting portion 214 is located outside the housing 11, and the connection point between the second body portion 221 and the second connecting portion 224 is also located outside the housing 11. Both the first body portion 211 and the second body portion 221 are located outside the housing 11. In a direction parallel to the first straight line 101, the minimum distance L3 between the first body portion 211 and the housing 11 is greater than 0 and less than or equal to 300 mm, and the minimum distance L4 between the second body portion 221 and the housing 11 is greater than 0 and less than or equal to 300 mm. Furthermore, in this example, the first body portion 211 is disposed on the lower side of the second body portion 221, the minimum distance L3 between the first body portion 211 and the maintenance cover 113 is greater than 0 and less than or equal to 50 mm, and the minimum distance L4 between the second body portion 221 and the maintenance cover 113 is greater than 50 mm and less than or equal to 200 mm. In this way, it is more convenient for the operator to separate the first body portion 211 and the first connecting portion 214, and to separate the second body portion 221 and the second connecting portion 224.

The ratio of the dimension L5 in the direction of the first straight line 101 of the part of the first connecting portion 214 protruding to the outside of the housing 11 to the dimension L6 of the first body portion 211 in the direction along the first straight line 101 is greater than 0 and less than or equal to 0.5. Further, the ratio of the dimension L5 in the direction of the first straight line 101 of the part of the first connecting portion 214 protruding to the outside of the housing 11 to the dimension L6 of the first body portion 211 in the direction along the first straight line 101 is greater than the ratio 0.02 and less than or equal to 0.25. In this way, on the one hand, the part of the first connecting portion 214 extending out of the housing 11 is long enough to drive the first body portion 211 to reciprocate more stably, avoiding shaking of the first body portion 211; on the other hand, the part of the first connecting portion 214 extending out of the housing 11 is not too long to affect the cutting efficiency due to insufficient effective cutting portion of the first body portion 211. It can be understood that the connection point between the first body portion 211 and the first connecting portion 214 is not limited to being located outside the housing 11, and the connection point between the second body portion 221 and the second connecting portion 224 is not limited to being located outside the housing 11. In fact, in another example, the connection point between the first body portion 211 and the first connecting portion 214 may also be located inside the housing 11, and the connection point between the second body portion 221 and the second connecting portion 224 may also be located inside the housing 11, as long as some reasonable structure is provided on the housing 11 to separate the first body portion 211 and the first connecting portion 214 and separate the second body portion 221 and the second connecting portion 224. In this case, it can be understood that the first connecting portion 214 and the first body portion 211 form a detachable connection, and the projection of the connection point between the first connecting portion 214 and the first body portion 211 in a plane perpendicular to the first straight line 101 is located outside the projection of the first eccentric portion 132c in said plane; further, the projection of the connection point between the first connecting portion 214 and the first body portion 211 in a plane perpendicular to the first straight line 101 is located outside the projection of the eccentric assembly 132 in said plane; the second connecting portion 224 and the second body portion 221 form a detachable connection, and the projection of the connection point between the second connecting portion 224 and the second body portion 221 in a plane perpendicular to the second straight line 102 is located outside the projection of the second eccentric portion 132d in said plane; further, the projection of the connection point between the second connecting portion 224 and the second body portion 221 in a plane perpendicular to the second straight line 102 is located outside the projection of the eccentric assembly 132 in said plane. Furthermore, the projection of the connection point between the second connecting portion 224 and the second body portion 221 in a plane perpendicular to the second straight line 102 is located outside the projection of the eccentric assembly 132 in said plane. Furthermore, the minimum distance L7 between the connection point of the first body portion 211 and the first connecting portion 214 and a rotation axis of the first eccentric portion 132c is greater than or equal to 80 mm and less than or equal to 500 mm. In fact, in this example, the rotation axis of the first eccentric portion 132c is also the prime mover axis 103 of the prime mover shaft 121.

Each of the above two methods can make the first body portion 211 and the first connecting portion 214 form a detachable connection separable without removing the maintenance cover 113, and also make the second body portion 221 and the second connecting portion 224 form a detachable connection separable without removing the maintenance cover 113. Specific implementations are not limited to the above two methods.

In this example, the hedge trimmer 100 further includes a stopper 23 for restricting the first body portion 211 from being detached from the first connecting portion 214, and the stopper 23 can also restrict the second body portion 221 from being detached from the second connecting portion 224. The stopper 23 has a limiting state that restricts the first body portion 211 from being detached from the first connecting portion 214 and an unlocked state that allows the first body portion 211 to be detached from the first connecting portion 214; the stopper 23 is at least partially disposed outside the housing 11. The stopper 23 can be operated by the operator from outside the housing 11 to switch it from the limiting state to the unlocked state. When the stopper 23 is in the limiting state, the stopper 23 prevents the first body portion 211 from being detached from the first connecting portion 214 and prevents the second body portion 221 from being detached from the second connecting portion 224; when the stopper 23 is in the unlocked state, the stopper 23 allows the first body portion 211 to be detached from the first connecting portion 214 and allows the second body portion 221 to be detached from the second connecting portion 224.

Specifically, the housing 11 also opens forward, so that the blade assembly 20 can extend forward to the outside of the housing 11. The first body portion 211 of the first blade 21 is located outside the housing 11, and the whole formed by the first body portion 211 and the first tooth portions 212 extends substantially in a first plane parallel to the first straight line 101. A part of the first connecting portion 214 is located inside the housing 11 and another part is located outside the housing 11. That is, the first connecting portion 214 is at least partially located inside the housing 11, and the first connecting portion 214 also extends forwardly to the outside of the housing 11, and thus the first connecting portion 214 and the first body portion 211 form a detachable connection outside the housing 11. In other words, the connection point between the first body portion 211 and the first connecting portion 214 is located outside the housing 11. The first connecting portion 214 also extends substantially in a second plane parallel to the first straight line 101, the first plane and the second plane are parallel to each other and do not overlap; that is, the first body portion 211 and the first connecting portion 214 have a height difference in the height direction. In this way, in this example, the first connecting portion 214 and the first body portion 211 form a detachable connection in a direction perpendicular to the first straight line 101, that is, the first connecting portion 214 and the first body portion 211 form a detachable connection in the height direction. In this way, the first body portion 211 can be detached downward from the first connecting portion 214. Specifically, in this example, the first connecting portion 214 is formed with a first connecting hole 214a passing through itself in the height direction, and the first body portion 211 is formed with a first mating hole 211a passing through itself in the height direction. The blade assembly 20 further includes a first connecting member 215 that sequentially passes through the first connecting hole 214a and the first mating hole 211a along the height direction. The first connecting member 15 may be a pin. In this example, the first connecting member 215 is specifically a rivet. The rivet is in an interference fit with the first connecting hole 214a, and the rivet is also in a clearance fit with the first mating hole 211a. Of course, the rivet may also be in an interference fit with the first mating hole 211a and a clearance fit with the first connecting hole 214a. Thus, when it is necessary to separate the first body portion 211 and the first connecting portion 214, only the point where the first body portion 211 is connected to the first connecting portion 214 needs to be toggled downward to disassemble the first body portion 211 from the first connecting portion 214. In this example, the first driving portion 213 and the first connecting portion 214 are respectively formed by two different parts, i.e., the first driving portion 213 and the first connecting portion 214 are separately formed and fixedly connected. Of course, it can be understood that, in other examples, the first driving portion 213 and the first connecting portion 214 may also be integrally formed by one part. Alternatively, in other examples, the first driving portion 213 and the first connecting portion 214 may also be movably connected, so that the first driving portion 213 can swing relative to the first connecting portion 214. It can be understood that the operator may turn the hedge trimmer 100 over when disassembling the blade assembly 20, that is, make the maintenance cover 113 on the lower part of the hedge trimmer 100 face upwards. At this time, correspondingly, the operator may need to lift the first body portion 211 up to detach it from the first connecting portion 214. In this example, a more durable ring part is also provided in the first mating hole 211a, and the ring part is detachably disposed in the first mating hole. The ring part is specifically a first bushing 211b. The wear resistance of the bushing 211b is greater than that of the first mating hole 211a. Of course, it is understandable that when the rivet is in an interference fit with the first mating hole 211a, the first bushing 211b may also be arranged in the first connecting hole 214a. In addition, in other examples, the first connecting member 215 may also be integrally formed with the first connecting portion 214 or the first body portion 211. For example, the first body portion 211 may also be integrally formed with a protruding structure, and the first connecting portion 214 is formed with a groove or hole into which the protruding structure can be embedded; alternatively, the protruding structure can also be formed on the first connecting portion 214, and the first body portion 211 is formed with a groove or hole into which the protruding structure can be embedded.

The second body portion 221 of the second blade 22 is located outside the housing 11, and the whole formed by the second body portion 221 and the second tooth portions 222 extends substantially in a third plane parallel to the second straight line 102. A part of the second connecting portion 224 is located inside the housing 11 and another part is located outside the housing 11. That is, the second connecting portion 224 is at least partially located inside the housing 11, and the second connecting portion 224 also extends forwardly to the outside of the housing 11, and thus the second connecting portion 224 and the second body portion 221 form a detachable connection outside the housing 11. In other words, the connection point between the second body portion 221 and the second connecting portion 224 is located outside the housing 11. The second connecting portion 224 also extends substantially in a fourth plane parallel to the second straight line 102, the fourth plane and the third plane are parallel to each other and do not overlap; that is, the second body portion 221 and the second connecting portion 224 have a height difference in the height direction. In this way, in this example, the second connecting portion 224 and the second body portion 221 form a detachable connection in a direction perpendicular to the second straight line 102, that is, the second connecting portion 224 and the second body portion 221 form a detachable connection in the height direction. In this way, the second body portion 221 can be detached downward from the second connecting portion 224. Specifically, in this example, the second connecting portion 224 is formed with a second connecting hole 224a passing through itself in the height direction, and the second body portion 221 is formed with a second mating hole 221a passing through itself in the height direction. The blade assembly 20 further includes a second connecting member 225 that sequentially passes through the second connecting hole 224a and the second mating hole 221a along the height direction. The second connecting member 225 may be a pin. In this example, the second connecting member 225 is specifically a rivet. The rivet is in an interference fit with the second connecting hole 224a, and the rivet is also in a clearance fit with the second mating hole 221a. Of course, the rivet may also be in an interference fit with the second mating hole 221a and a clearance fit with the second connecting hole 224a. Thus, when it is necessary to separate the second body portion 221 and the second connecting portion 224, only the point where the second body portion 221 is connected to the second connecting portion 224 needs to be toggled downward to disassemble the second body portion 221 from the second connecting portion 224. In this example, the second driving portion 223 and the second connecting portion 224 are respectively formed by two different parts, i.e., the second driving portion 223 and the second connecting portion 224 are separately formed and fixedly connected. Of course, it can be understood that, in other examples, the second driving portion 223 and the second connecting portion 224 may also be integrally formed by one part. Alternatively, in other examples, the second driving portion 223 and the second connecting portion 224 may also be movably connected, so that the second driving portion 223 can swing relative to the second connecting portion 224. It can be understood that the operator may turn the hedge trimmer 100 over when disassembling the blade assembly 20, that is, make the maintenance cover 113 on the lower part of the hedge trimmer 100 face upwards. At this time, correspondingly, the operator may need to lift the second body portion 221 up to detach it from the second connecting portion 224. In this example, a more durable ring part is also provided in the second mating hole 221a, and the ring part is specifically a second bushing 221b. The wear resistance of the second bushing 221b is greater than that of the second mating hole 221a. In addition, in other examples, the second connecting member 225 may also be integrally formed with the second connecting portion 224 or the second body portion 221. For example, the second body portion 221 may also be integrally formed with a protruding structure, and the second connecting portion 224 is formed with a groove or hole into which the protruding structure can be embedded; alternatively, the protruding structure can also be formed on the second connecting portion 224, and the second body portion 221 is formed with a groove or hole into which the protruding structure can be embedded.

In this example, there is a height difference between the first body portion 211 and the first connecting portion 214, which, on the one hand, makes the detachable connection structure formed by the first body portion 211 and the first connecting portion 214 simpler, and easier to realize the detachable connection between the first body portion 211 and the first connecting portion 214; on the other hand, makes the first body portion 211 and the first connecting portion 214 superimposed on each other so that the whole formed by the two is thicker at the joint, thereby improving the connection strength and making the first blade 21 more durable. Furthermore, the height difference between the first body portion 211 and the first connecting portion 214 makes it possible for a pin to insert into the first mating hole 211a to realize the detachable connection between the first body portion 211 and the first connecting portion 214, thereby reducing the fitting gap at the joint, so that the noise and vibration performance of the connection can be significantly improved. In short, the connection between the first body portion 211 and the first connecting portion 214 with a height difference makes the mating surface of the connection thick, which has great advantages in improving the connection strength and wear resistance. In addition, the connection with a height difference makes it convenient to realize the connection of a pin and a hole. This connection approach is convenient to realize a high-precision precision fit, and such a precision fit helps to reduce the fitting gap of the connection, which is obviously advantageous in terms of noise and vibration.

In this example, along the first straight direction, the connection point of the first body portion 211 and the first connecting portion 214 and the connection point of the second body portion and the second connecting portion are separated by a certain distance, so that the structure of the blade is more problematic, and the vibration effect.

The stopper 23 is configured to prevent the first body portion 211 from being detached from the first connecting portion 214. Specifically, the direction in which the first body portion 211 is detached from the first connecting portion 214 is defined as a first direction, and the stopper 23 is a pressing plate that can prevent the first body portion 211 from being detached from the first connecting portion 214 in the first direction. The first body portion 211 is disposed between the pressing plate and the first connecting portion 214, and the first direction and the first straight line 101 are perpendicular to each other, in fact, the first direction is the height direction. Thus, the stopper 23 presses the first body portion 211 to the first connecting portion 214 in a direction perpendicular to the first straight line 101. Of course, it is understandable that the stopper 23 can also press the first body portion 211 to the first connecting portion 214 in a direction obliquely intersecting with the first straight line 101. The first blade 21 is disposed on the lower side of the second blade 22, and the stopper 23 prevents the first body portion 211 from being downwardly detached from the first connecting portion 214. Of course, it is understandable that in other examples, in the up-down direction, the positions of the first connecting portion and the first body portion can also be interchanged, that is, the first connecting portion can also be arranged between the pressing plate and the first body portion, at this time, the stopper presses the first connecting portion to the first body portion in a direction perpendicular to the first straight line or in a direction obliquely intersecting with the first straight line.

The stopper 23 extends in a direction parallel to the first straight line 101, and the stopper 23 is disposed on the lower side of the first blade 21 against the first blade 21 to prevent the first body portion 211 from being detached from the first connecting portion 214. The stopper 23 is partially disposed inside the housing 11, and the stopper 23 also extends forward to the outside of the housing 11. The blade assembly 20 further includes a support bar 24 for supporting the first blade 21 and the second blade 22, and the stopper 23 is mounted to the support bar 24. The blade assembly 20 further includes a fastener for positioning the stopper 23 in a locked state, and the fastener is specifically a first type of screw 25, and the first type of screw 25 fixes the stopper 23 to the support bar 24. When the first type of screw 25 is unscrewed or loosened by the operator, the operator can pull out the stopper 23, so that the stopper 23 is switched to the unlocked state to release the restriction on the first body portion 211 and the first connecting portion 214. At this time, the operator can disengage the first body portion 211 from the first connecting portion 214. A part of the stopper 23 is located inside the housing 11, and another part extends out of the housing 11. The portion of the stopper 23 located outside the housing 11 that can be operated by the user to pull out the stopper 23 can be defined as an operating portion 231. The operating portion 231 is operable by the operator without disassembling the housing 11. In this example, the first type of screw 25 is arranged outside the housing 11, so that the operator does not need to disassemble the maintenance cover 113 and does not need to open the housing 11 to disassemble the first body portion 211 of the blade assembly 20, thereby making the operation more convenient. In the present example, the number of the first type of screw 25 is 1, it is understood that, the number of the first type of screw 25 is not restricted to 1, may be 2, of course, for the convenience of disassembly, the number of the first type of screw 25 can be limited to less than three. In this way, when the user needs to replace the first body portion 211 and the second body portion 221, the user only needs to unscrew one or two screws, thereby improving the convenience of operation.

More specifically, in this example, the length of the first body portion 211 of the first blade 21 located on the lower side is greater than the length of the second body portion 221 of the second blade 22 located on the upper side, and the length of the first connecting portion 214 is smaller than the length of the second connecting portion 224, so that the connection point between the first connecting portion 214 and the first body portion 211 is located on a rear side of the connection point between the second connecting portion 224 and the second body portion 221. The first type of screw 25 sequentially passes through the stopper 23, the first body portion 211, and the second connecting portion 224 in a direction of a third straight line 104 perpendicular to the first straight line 101, and then mounts the stopper 23, the first blade 21, and the second blade 22 onto the support bar 24.

The length of the first body portion 211 in the direction along the first straight line 101 is relatively long, and the length of the second body portion 221 in the direction along the second straight line 102 is also relatively long. In order to fix the first body portion 211 and a second body portion 221 along the height direction, the blade assembly 20 further includes a fastener to fix the first body portion 211 and the second body portion 221 to the support bar 24; the fastener is specifically a plurality of second type of screws 26. The plurality of second type of screws 26 pass through the first body portion 211 and the second body portion 221 along a direction of a fourth straight line 105 perpendicular to the first straight line 101, thereby preventing the first body portion 211 and the second body portion 221 to be attached in the height direction to improve cutting ability, and also preventing the first body portion 211 and the second body portion 221 from shaking. The number of the plurality of second type of screws 26 is multiple. For example, in this example, the number of the plurality of second type of screws 26 is seven. The plurality of second type of screws 26 do not pass through the stopper 23, so that plurality of the second type of screws 26 can fix the first body portion 211 and the second body portion 221 without restricting the stopper 23.

Specifically, a plurality of first mounting holes 211c are formed on the first body portion 211, and the plurality of second type of screws 26 pass through the first mounting holes 211c to mount the first body portion 211 to the support bar 24. The first mounting hole 211c includes a first sliding portion 211d that allows the plurality of second type of screws 26 to slide in a direction parallel to the first straight line 101 and prevents the plurality of second type of screws 26 from passing by, and a first through hole portion 211e that allows the first body portion 211 to be detached from the plurality of second type of screws 26 in the height direction. Specifically, the plurality of second type of screws 26 include a cylindrical shank centered on the fourth straight line 105 and a head provided at one end of the shank. The radial dimension of the head is greater than the radial dimension of the shank. The first sliding portion 211d is an elongated hole extending in the direction of the first straight line 101. The size of the first sliding portion 211d in the width direction is larger than the size of the shank of the plurality of second type of screws 26 in the width direction and smaller than the size of the head in that direction. Wherein, a washer can also be connected to the plurality of second type of screws 26 to prevent the first body portion 211 from being disengaged from the plurality of second type of screws 26. The first through hole portion 211e is provided at one end of the first sliding portion 211d, and the size of the first through hole portion 211e in the width direction is larger than the size of the head or the washer in the width direction. The maximum size of the first through hole portion 211e in the width direction is also greater than the maximum size of the first sliding portion 211d in the width direction. Therefore, when the plurality of second type of screws 26 pass through the first mounting holes 211c and connect to the support bar 24, when the plurality of second type of screws 26 engage with the first sliding portions 211d, the first body portion 211 cannot be detached from the plurality of second type of screws 26 in the height direction. And when the first body portion 211 slides along the first straight line 101 until the first through hole portion 211e is engaged with the plurality of second type of screws 26, the first body portion 211 can be detached from the plurality of second type of screws 26 in the height direction. In this example, the first through hole portion 211e is a circular hole, and the diameter of the first through hole portion 211e is greater than the maximum dimension of the first sliding portion 211d in the width direction. In this way, the first body portion 211 has at least a first position and a second position relative to the plurality of second type of screws 26 along the direction of the first straight line 101. When the first body portion 211 is at the first position, the plurality of second type of screws 26 prevent the first body portion 211 from being detached from the support bar 24. When the first body portion 211 is in the second position, the plurality of second type of screws 26 allow the first body portion 211 to be detached from the support bar 24. In this example, in order to improve the strength of the blade assembly 20, the center of the circular hole is not on the first straight line 101, and the circular hole is not symmetrical about the first straight line 101. With respect to the first tooth portions 212 on the left side of first body portion 211, the circular hole is aligned with the first tooth portions 212 on the left side; with respect to the first tooth portions 212 on the right side of the first body portion 211, the circular hole is arranged between the two adjacent first tooth portions 212 on the right side. At this time, in order to avoid insufficient strength of the portion of the first body portion 211 on the right side of the circular hole, the circular hole is deviated to the left, that is, the center of the circular hole is set on the left side of the first straight line 101.

A plurality of second mounting holes 221c are formed on the second body portion 221, and the plurality of second type of screws 26 pass through the second mounting holes 221c to mount the second body portion 221 to the support bar 24. The second mounting hole 221c includes a second sliding portion 221d that allows the plurality of second type of screws 26 to slide in a direction parallel to the second straight line 102 and prevents the plurality of second type of screws 26 from passing by, and a second through hole portion 221e that allows the second body portion 221 to be detached from the plurality of second type of screws 26 in the height direction. The second sliding portion 221d is an elongated hole extending in the direction of the second straight line 102. The size of the second sliding portion 221d in the width direction is greater than the size of the shaft of the plurality of second type of screws 26 in the width direction and smaller than the size of the head or the washer in that direction. The second through hole portion 221e is provided at one end of the second sliding portion 221d, and the size of the second through hole portion 221e in the width direction is larger than the size of the head or the washer in the width direction. The maximum size of the second through hole portion 221e in the width direction is also greater than the maximum size of the second sliding portion 221d in the width direction. Therefore, when the plurality of second type of screws 26 pass through the second mounting holes 221c and connect to the support bar 24, when the plurality of second type of screws 26 engage with the second sliding portions 221d, the second body portion 221 cannot be detached from the plurality of second type of screws 26 in the height direction. And when the second body portion 221 slides along the second straight line 102 until the second through hole portion 221e is engaged with the plurality of second type of screws 26, the second body portion 221 can be detached from the plurality of second type of screws 26 in the height direction. In this example, the second through hole portion 221e is a circular hole, and the diameter of the second through hole portion 221e is greater than the maximum dimension of the second sliding portion 221d in the width direction. In this way, the second body portion 221 has at least a third position and a fourth position relative to the plurality of second type of screws 26 along the direction of the second straight line 102. When the second body portion 221 is in the third position, the plurality of second type of screws 26 prevent the second body portion 221 from being detached from the support bar 24. When the second body portion 221 is in the fourth position, the plurality of second type of screws 26 allow the second body portion 221 to be detached from the support bar 24.

In the present example, in order to improve the service life of the hedge trimmer 100, and reduce the usage cost of the hedge trimmer 100, the first body portion 211 and the second body portion 221 are made of a first material, and the first connecting portion 214 and the second connecting portion 224 are made of a second material different from the first material, wherein the second material has batter wear resistance and hardness than the first material.

Figure 8:
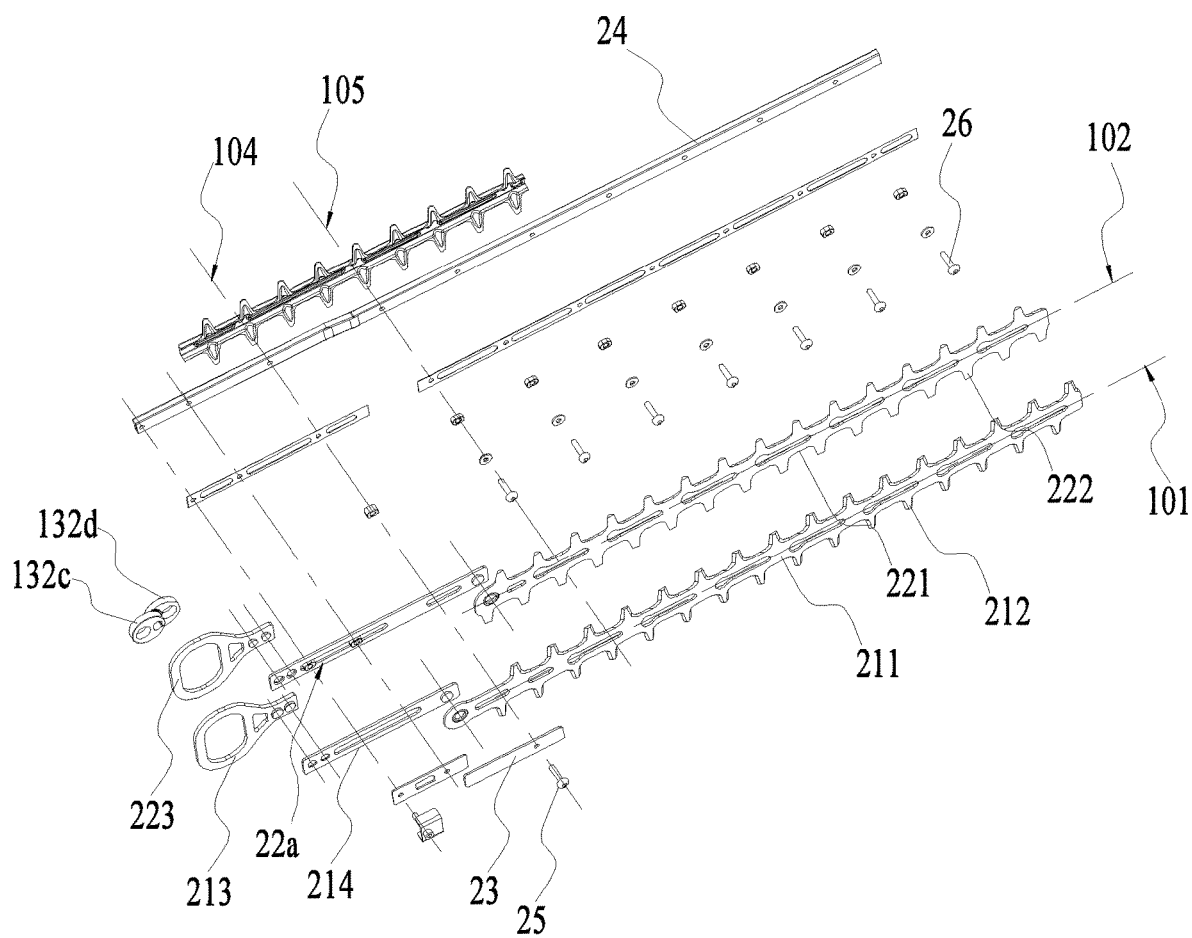
FIG. 8 is an exploded view of the eccentric assembly and the blade assembly in the hedge trimmer in FIG. 2.
Figure 9:
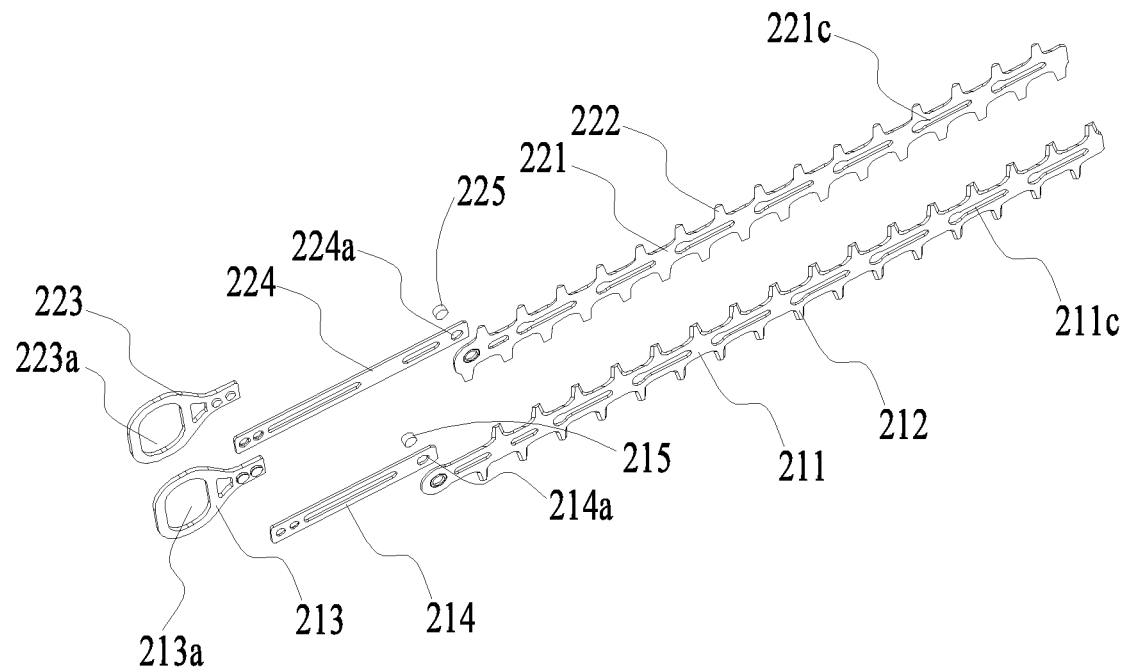
FIG. 9 is an exploded view of a first blade and a second blade in the blade assembly in FIG. 8.
Figure 12:
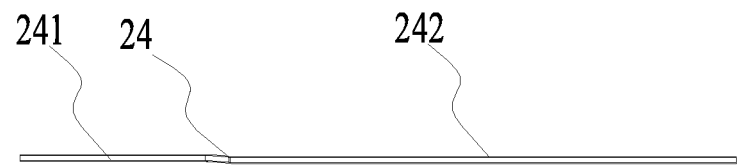
FIG. 12 is a plan view of the support bar in the blade assembly in FIG. 8.

As shown in FIGS. 8 and 12, the support bar 24 includes: a first support portion 241 for supporting the first connecting portion 214 and a second support portion 242 for supporting the first body portion 211. As there is a height difference between the first connecting portion 214 and the first body portion 211, there is also a height difference in the height direction between the first support portion 241 and the second support portion 242, so as to better support the first blade 21 and the second blade 22 and improve the stability and reliability of the blade assembly 20. In this way, the first type of screw 25 can pass through the stopper 23 and the first support portion 241 to fix the stopper 23 to the first support portion 241, and the plurality of second type of screws 26 can pass through the first mounting holes 211c, the second mounting holes 221c and the second support portion 242 to fix the first body portion 211 and the second body portion 221 to the second support portion 242.

Figure 13:
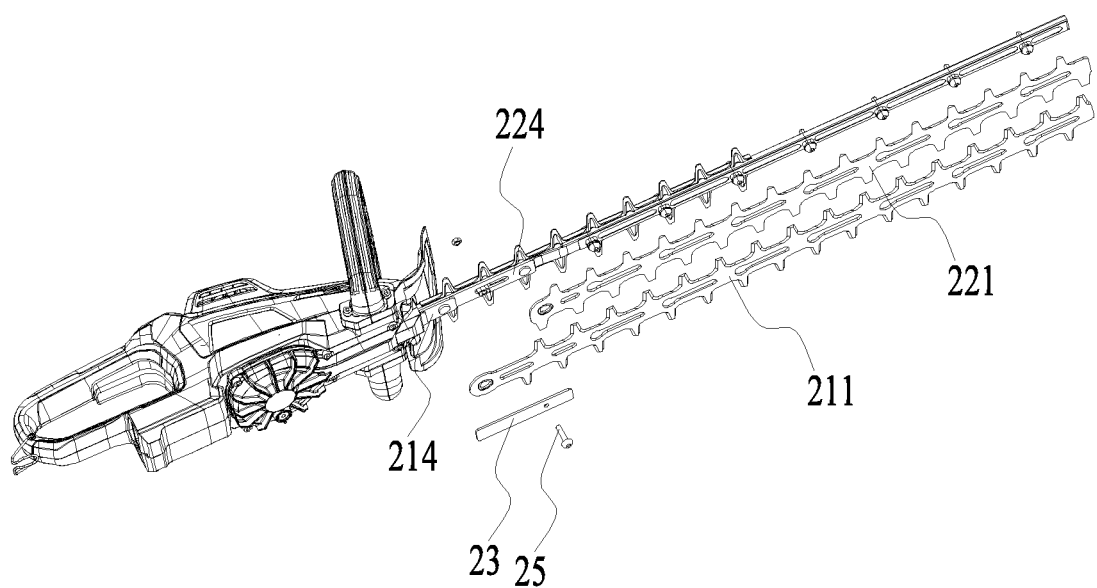
FIG. 13 is a perspective view of the hedge trimmer of FIG. 1 with the first body portion and the second body portion disassembled.
Figure 14:
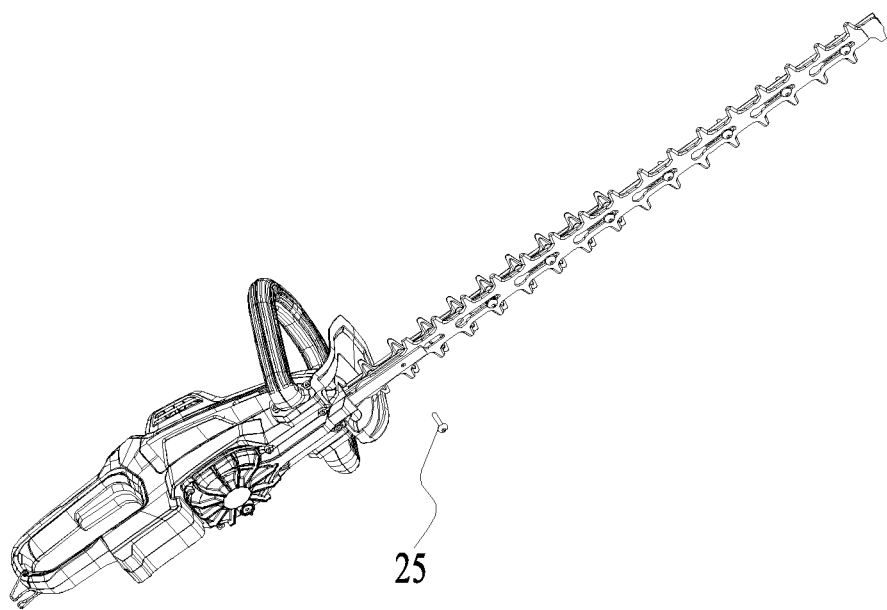
FIG. 14 is a perspective view of the hedge trimmer of FIG. 1 with a first type of screw disassembled.
Figure 15:
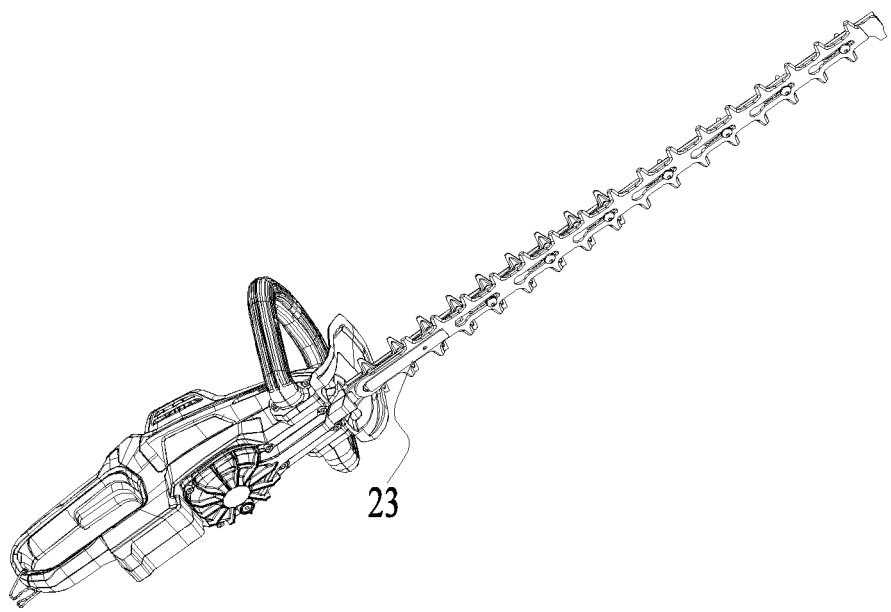
FIG. 15 is a perspective view of the hedge trimmer of FIG. 1 after the stopper is drawn out.
Figure 16:
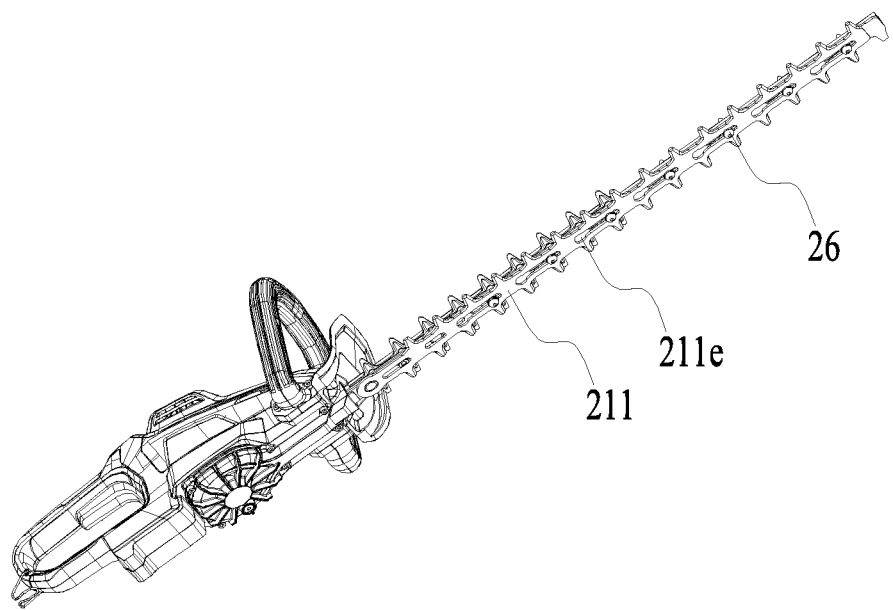
FIG. 16 is a perspective view of the hedge trimmer of FIG. 1 after the stopper is removed.
Figure 17:
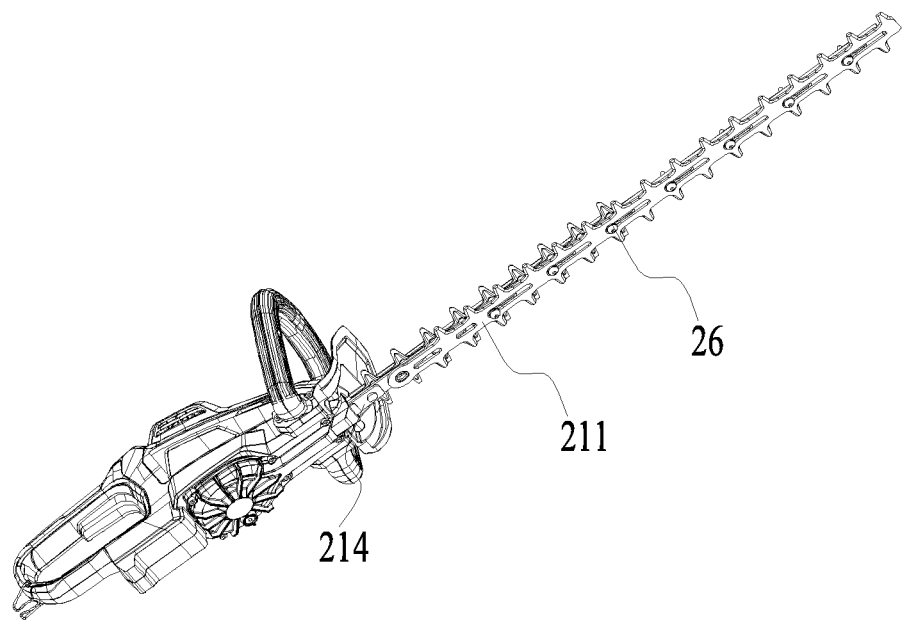
FIG. 17 is a perspective view of the hedge trimmer of FIG. 1 when the first body portion is detached from a first connecting portion.
Figure 18:
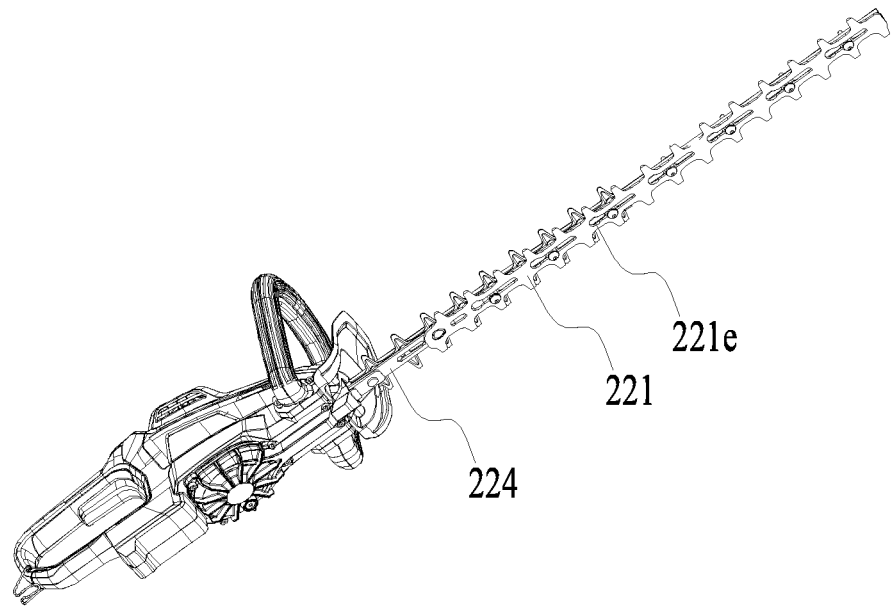
FIG. 18 is a perspective view of the hedge trimmer of FIG. 1 after the first body portion is removed.
Figure 19:
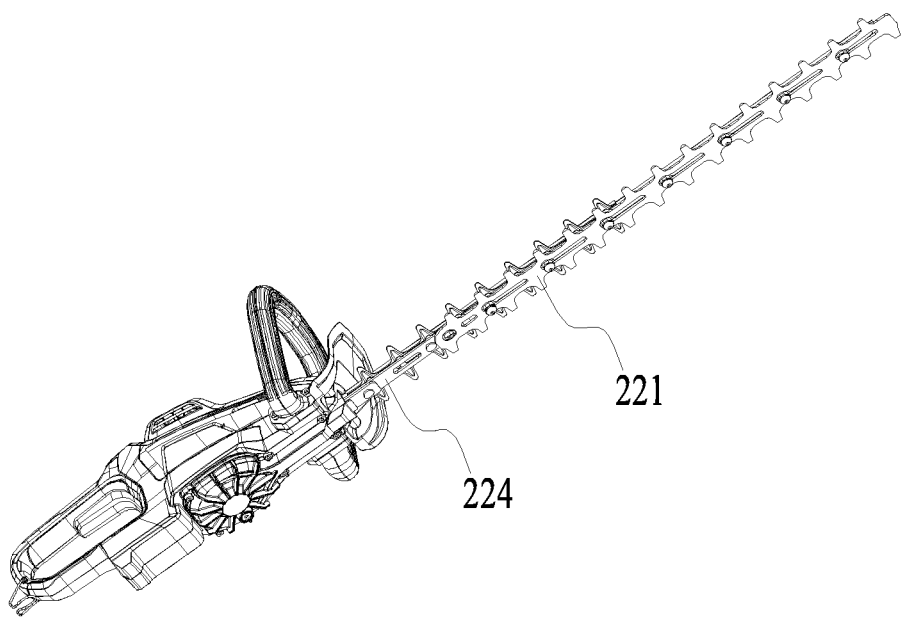
FIG. 19 is a perspective view of the hedge trimmer of FIG. 1 when the second body portion is detached from a second connecting portion.
Figure 20:
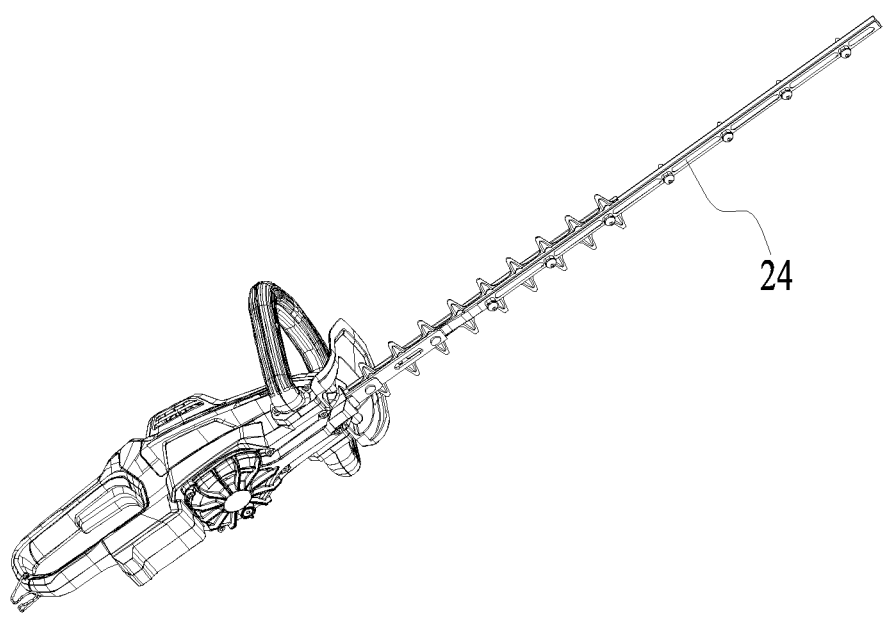
FIG. 20 is a perspective view of the hedge trimmer of FIG. 1 after the second body portion is removed.

The specific steps for disassembling the first body portion 211 and the second body portion 221 are described in detail below:

As shown in FIGS. 13 and 14, the operator first removes the first type of screw 25; then, as shown in FIGS. 14 and 15, the operator pulls out the stopper 23 outwards to make the stopper 23 in an unlocked state; then, as shown in FIGS. 13 and 16, remove the stopper 23; then, as shown in FIGS. 13, 16 and 17, move down the connection point between the first body portion 211 and the first connecting portion 214 to disengage the first body portion 211 downward from the first connecting portion 214, and push the first body portion 211 forward so that the first body portion 211 moves forward to a position where the plurality of second type of screws 26 are engaged with the first through hole portion 211e; then, as shown in FIGS. 13, 18 and 19, move down the connection point between the second body portion 221 and the second connecting portion 224 to disengage the second body portion 221 downward from the second connecting portion 224, and push the second body portion 221 forward so that the second body portion 221 moves forward to a position where the plurality of second type of screws 26 are engaged with the second through hole portion 221e; then, as shown in FIGS. 13, 19 and 20, the second body portion 221 can be removed at this time.

In this example, in the process of replacing the first body portion 211 and the second body portion 221, the operator only needs to disassemble and assemble a first type of screw 25, and does not need to disassemble the maintenance cover 113, therefore the entire disassembly process only takes a few minutes, which improves work efficiency.

In this example, the stopper 23 is removed by removing the first type of screw 25. In fact, it is understandable that in other examples, the stopper 23 can also be provided with a hole of a similar structure to the first mounting hole 211c, such that the stopper 23 can also be disassembled even if the first type of screw 25 is not removed; alternatively, in other examples, the stopper 23 is not fixed by screws, but fixed by other structures such as a buckle.

Figure 10:
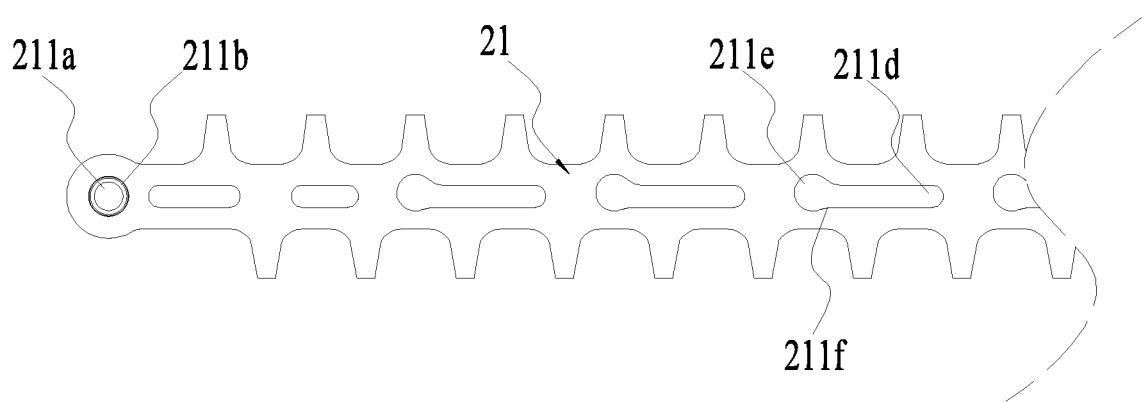
FIG. 10 is a plan view of a part of the structure of a first body portion in the blade assembly in FIG. 8.

In this example, referring to FIG. 10, a guide portion 211f is further provided at the connection point between the first through hole portion 211e and the first sliding portion 211d. The guide portion 211f can guide the first body portion 211 to move from a position where the first sliding portion 211d contacts the plurality of second type of screw 26 to a position where the first through hole portion 211e contacts the plurality of second type of screw 26, and the guide portion 211f can also guide the first body portion 211 to move from a position where the first through hole portion 211e contacts the plurality of second type of screw 26 to a position where the first sliding portion 211d contacts the plurality of second type of screw 26. In this example, the guide portion 211f is a chamfer, and further, a round. The number of the first mounting holes 211c is multiple, and the guide portions 211f of two adjacent first mounting holes 211c are rounded corners with different corner radius. In this way, when assembling the first body portion 211, the guide portions 211f can guide the plurality of second type of screws 26 to successively engage with corresponding first mounting holes 211c, that is, a first of the plurality of second type of screws 26 engages with its corresponding first mounting hole 211c, then a second of the plurality of second type of screws 26 engages with its corresponding first mounting hole 211c, and then a third of the plurality of second type of screws 26 engages with its corresponding first mounting hole 211c; and when disassembling the first body portion 211, the guide portions 211f can guide the plurality of second type of screws 26 to successively disengage with corresponding first mounting holes 211c, thereby reducing the friction force received by the first body portion 211 during disassembly or assembly, and improving operational performance. Wherein the engagement of the plurality of second type of screws 26 with the first mounting holes 211c refers to the first body portion 211 moving to a position where the first through hole portions 211e contact the plurality of second type of screws 26, and the disengagement of the plurality of second type of screws 26 with the first mounting holes 211e refers to the first body portion 211 moving to a position where the first sliding portions 211d contact the plurality of second type of screws 26.

Figure 11:
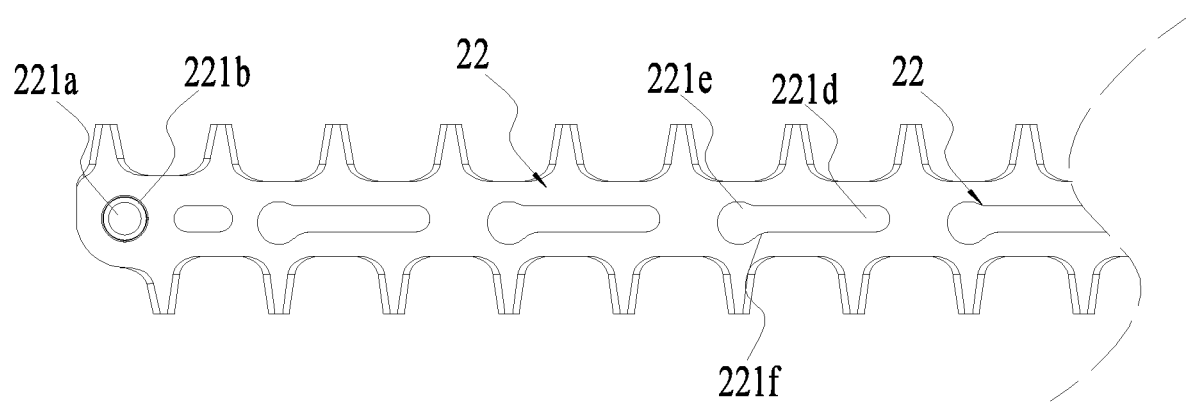
FIG. 11 is a plan view of a part of the structure of a second body portion in the blade assembly in FIG. 8.

Referring to FIG. 11, a guide portion 221f is further provided at the connection point between the second through hole portion 221e and the second sliding portion 221d. The guide portion 221f can guide the second body portion 221 to move from a position where the second sliding portion 221d contacts the plurality of second type of screws 26 to a position where the second through hole portion 221e contacts the plurality of second type of screws 26, and the guide portion 221f can also guide the second body portion 221 to move from a position where the second through hole portion 221e contacts the plurality of second type of screws 26 to a position where the second sliding portion 221d contacts the plurality of second type of screws 26. In this example, the guide portion 221f is a chamfer, and further, a round. The number of the second mounting holes 221c is multiple, and the guide portions 221f of two adjacent second mounting holes 221c are rounded corners with different corner radius. In this way, when assembling the second body portion 221, the guide portions 221f can guide the plurality of second type of screws 26 to successively engage with corresponding second mounting holes 221c; and when disassembling the second body portion 221, the guide portions 221f can guide the plurality of second type of screws 26 to successively disengage with corresponding second mounting holes 221c, thereby reducing the friction force received by the second body portion 221 during disassembly or assembly, and improving operational performance. Wherein the engagement of the plurality of second type of screws 26 with the second mounting holes 221c refers to the second body portion 221 moving to a position where the second through hole portions 221e contact the plurality of second type of screws 26, and the disengagement of the plurality of second type of screws 26 with the second mounting holes 221c refers to 221 to the second body portion 221 moving to a position where the second sliding portions 221d contact the plurality of second type of screws 26.

Figure 21:
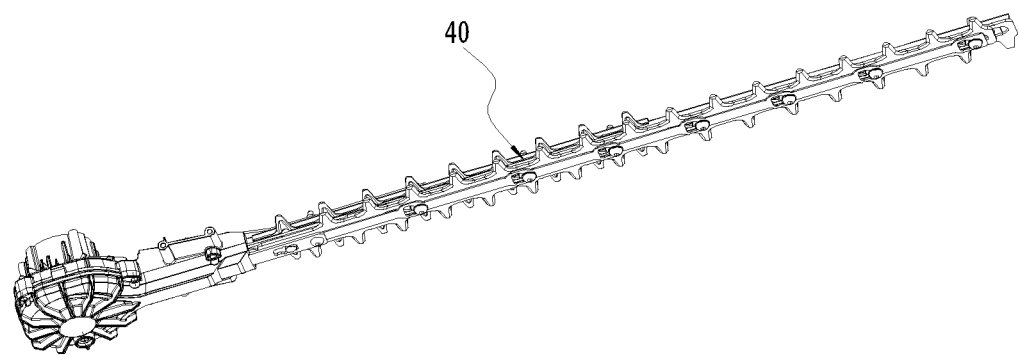
FIG. 21 is a perspective view of a part of a housing structure and a blade assembly of a hedge trimmer according to a second example in this disclosure.
Figure 22:
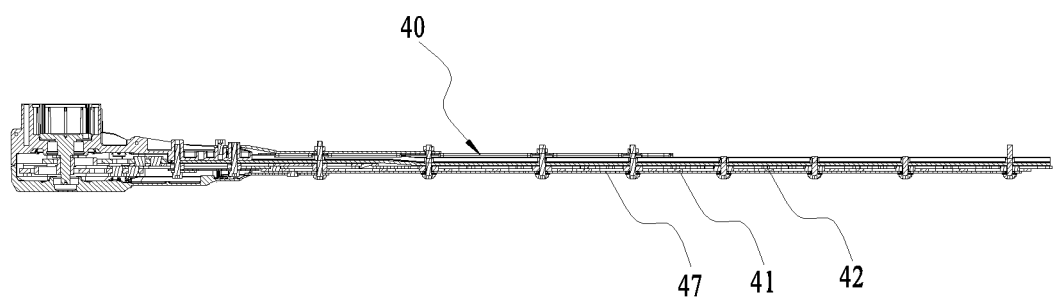
FIG. 22 is a cross-sectional view of the structure shown in FIG. 21.
Figure 23:
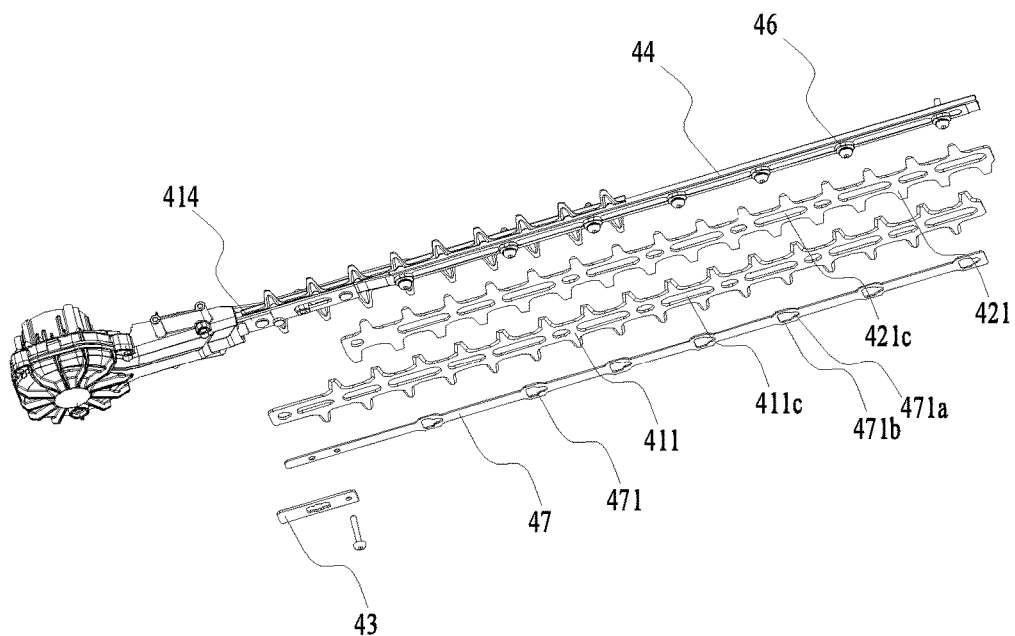
FIG. 23 is a perspective view of the structure shown in FIG. 21 with a first body portion and a second body portion disassembled.

The present disclosure further proposes a hedge trimmer according to a second example, which has the same housing, prime mover, and transmission device as the hedge trimmer 100 according to the first example. As shown in FIGS. 21 to 23, the hedge trimmer of this example further includes a blade assembly 40, and the blade assembly 40 includes a first blade 41 and a second blade 42. Wherein, the first blade 41 in this example is only different from the first blade 21 in the first example in the structure of a first mounting hole 411c. The second blade 42 in this example is only different from the second blade 22 in the first example in the structure of a second mounting hole 421c. The blade assembly 40 also includes a support bar 44 that has basically the same structure as in the first example. The structures of the hedge trimmer 100 of the first example that are compatible with this example can all be applied to this example. Only the differences between this example and the first example are described below.

In this example, the hedge trimmer also includes a stopper 43 for restricting a first body portion 411 from being detached from a first connecting portion 414. In this example, the blade assembly 40 further includes a pressing plate 47 for pressing the first body portion 411 and the second body portion 421 to the support bar 44. The pressing plate 47 is provided with a plurality of pressing holes 471. Each pressing hole 471 has a first pressing portion 471a and a second pressing portion 471b of different dimensions in the width direction. The maximum dimension of the first pressing portion 471a in the width direction is smaller than the maximum dimension of the second pressing portion 471b in the width direction. The first body portion 411 is formed with a plurality of first mounting holes 411c extending in a first straight line, the second body portion 421 is formed with a plurality of second mounting holes 421c extending in a second straight line. Both the first mounting holes 411c and the second mounting holes 421c are elongated holes. A plurality of second type of screws 46 sequentially pass through the pressing holes 471, the first mounting holes 411c and the second mounting holes 421c to mount the first body portion 411 and the second body portion 421 to the support bar 44. In this way, on the one hand, the operator can detach the first body portion 411 and the second body portion 421 without moving the first body portion 411 and the second body portion 421 back and forth, making the operation easier; on the other hand, the first body portion 411 and the second body portion 421 have simple structures and high strength.

Figure 24:
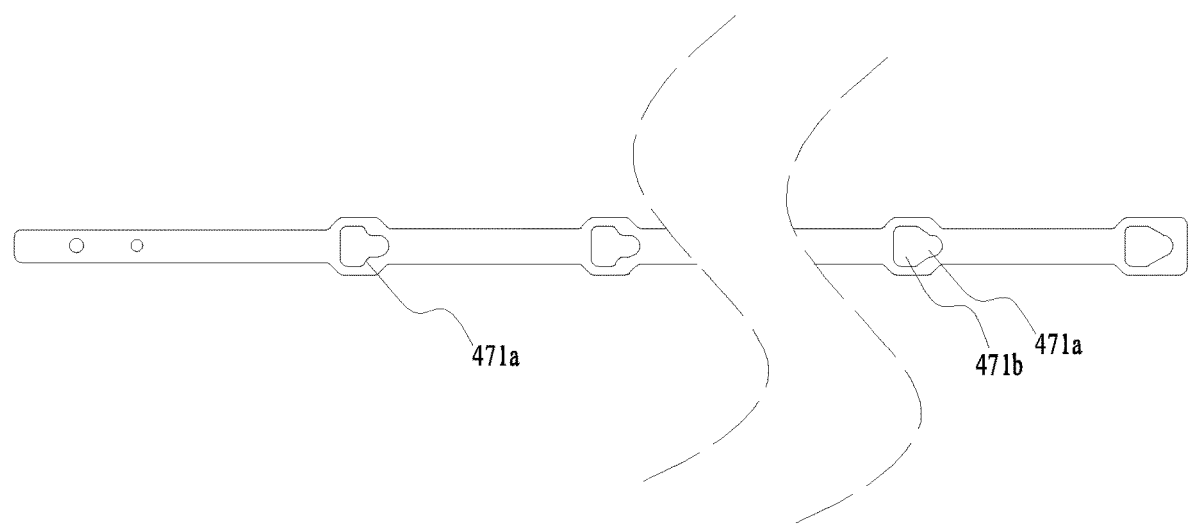
FIG. 24 is a schematic diagram of the structure of a pressing plate in FIG. 23.

As shown in FIGS. 23 and 24, a guide portion 471c is provided at the connection point between the first pressing portion 471a and the second pressing portion 471b, the guide portion 471c can guide the plurality of second type of screws 46 to move from the first pressing portion 471a to the second pressing portion 471b, the guide portion 471c can also guide the plurality of second type of screws 46 to move from the second pressing portion 471b to the first pressing portion 471a. In this example, the guide portion 471c is a bevel edge. The number of pressing holes 471 is multiple, and the guide portions 471c of two adjacent pressing holes 471 are bevel edges with different inclination. Thus, when assembling the pressing plate 47, the guide portions 471c can guide the plurality of second type of screws 46 to successively engage with corresponding second pressing portions 471b; when disassembling the pressing plate 47, the guide portions 471c can guide the plurality of second type of screws 46 to successively disengage with corresponding second pressing portions 471b, thereby reducing the friction force received by the pressing plate 47 during disassembly or assembly, and improving the operational performance. Wherein the engagement of the plurality of second type of screws 46 with the second pressing portion 471b refers to the pressing plate 47 moving to a position where the second pressing portions 471b contact the plurality of second type of screws 46, and the disengagement of the plurality of second type of screws 46 with the second pressing portion 471b refers to the pressing plate 47 moving to a position where the first pressing portions 471a contact the plurality of second type of screws 46.

The basic principles, main features and advantages of the present disclosure have been shown and described above. Those skilled in the art should understand that the foregoing examples do not limit the present disclosure in any form, and all technical solutions obtained by equivalent substitutions or equivalent transformations fall within the protection scope of the present disclosure.

The present disclosure provides a hedge trimmer that enables an operator to quickly replace the first body portion and the second body portion of the blade assembly, and reduces the usage cost.

What is claimed is:

1. A hedge trimmer, comprising:
a blade assembly comprising a first blade and a second blade that perform a cutting function with a relative motion;
a housing formed with an accommodating cavity;
a prime mover arranged inside the accommodating cavity; and
a transmission device for realizing power transmission between the prime mover and the blade assembly to drive the first blade and the second blade to produce the relative motion,
wherein the first blade comprises a first body portion extending along a first straight line, a plurality of first tooth portions configured to cut vegetation, a first connection assembly comprising a first driving portion connected with the transmission device to introduce a driving force output by the transmission device into the first blade, and a first connecting portion connected with the first body portion to make the first body portion move with the first driving portion,
the second blade comprises a second body portion extending along a second straight line, a plurality of second tooth portions configured to cut vegetation, a second connection assembly comprising a second driving portion connected with the transmission device to introduce a driving force output by the transmission device into the second blade, and a second connecting portion connected with the second body portion to make the second body portion move with the second driving portion,
the first connecting portion and the first body portion form a detachable connection, the second connecting portion and the second body portion form a detachable connection, and the first connecting portion is at least partially located outside the housing,
wherein the blade assembly further comprises a support bar for supporting the first blade and a second blade, the hedge trimmer further comprises a stopper enabled to restrict the first body portion from being detached from the first connecting portion, and the stopper has a limiting state that restricts the first body portion from being detached from the first connecting portion and an unlocked state that allows the first body portion to be detached from the first connecting portion, and
wherein the support bar is arranged on an upper side of a whole composed of the first blade and the second blade, the stopper is arranged on a lower side of the whole composed of the first blade and the second blade, the support bar comprises a first portion located in the housing and a second portion located outside the housing, a length of the stopper is less than the support bar, the stopper comprises a third portion located in the housing and a forth portion located outside the housing, and the forth portion is configured to operate by an operator without opening the housing so that the stopper is switched between the limiting state and the unlocked state.

2. The hedge trimmer of claim 1, wherein the first body portion and the first connecting portion form a detachable connection along a direction perpendicular to the first straight line and the second body portion and the second connecting portion form a detachable connection along a direction perpendicular to the second straight line.

3. The hedge trimmer of claim 1, wherein the first body portion extends in a first plane, the first connecting portion extends in a second plane, the first plane and the second plane are parallel and do not overlap, the second body portion extends in a third plane, the second connecting portion extends in a fourth plane, and the third plane and the fourth plane are parallel and do not overlap.

4. The hedge trimmer of claim 1, wherein the first body portion and the first connecting portion are located at different heights at a first connection point between the first body portion and the first connecting portion and the second body portion and the second connecting portion are located at different heights at a second connection point between the second body portion and the second connecting portion.

5. The hedge trimmer of claim 1, wherein the first driving portion and the first connecting portion are integrally formed and the second driving portion and the second connecting portion are integrally formed.

6. The hedge trimmer of claim 1, wherein the first connecting portion is formed or connected with a connecting member and the first body portion is formed with a mating hole for receiving the connecting member.

7. The hedge trimmer of claim 6, wherein a direction that the first body portion detaches from the first connecting portion is defined to be a first direction, the first blade is arranged on a lower side of the second blade, the stopper prevents the first body portion from being detached from the first connecting portion along the first direction, and the first direction and the first straight line are perpendicular to each other.

8. The hedge trimmer of claim 7, wherein the hedge trimmer further comprises one or two screws for positioning the stopper in the limiting state and the one or two screws are located outside the housing.

9. The hedge trimmer of claim 7, wherein the hedge trimmer further comprises a further screw for positioning the stopper in the limiting state.

10. The hedge trimmer of claim 7, wherein the hedge trimmer also comprises a first type of screw passing through the stopper along a third straight line direction perpendicular to the first straight line and a plurality of a second type of screws that pass through the first blade and the second blade along a fourth straight line direction perpendicular to the first straight line and do not pass through the stopper, the first body portion is formed with a plurality of mounting holes for the plurality of the second type of screws to pass through, and each of the plurality of mounting holes comprises a sliding portion that allows the plurality of the second type of screws to slide along a direction parallel to the first straight line while preventing the plurality of second type of screws from being removed from the plurality of mounting holes and a through hole portion that allows the first body portion to be detached from the plurality of second type of screws in a direction perpendicular to the first straight line.

11. The hedge trimmer of claim 10, wherein a maximum size of the sliding portion in a width direction is smaller than a maximum size of the through hole portion in a width direction.

12. The hedge trimmer of claim 11, wherein each of the plurality of mounting holes is also formed with a guide portion provided at a connection point between the sliding portion and the through hole portion, the guide portion guides the plurality of second type of screws to sequentially engage with a corresponding plurality of mounting holes when assembling the first body portion, and the guide portion guides the plurality of second type of screws to sequentially disengage with the corresponding plurality of mounting holes when disassembling the first body portion.

13. A hedge trimmer, comprising:
a blade assembly comprising a first blade and a second blade that perform a cutting function with a relative motion;
a housing formed with an accommodating cavity;
a prime mover arranged inside the accommodating cavity; and
a transmission device for realizing power transmission between the prime mover and the blade assembly to drive the first blade and the second blade to produce the relative motion,
wherein the first blade comprises a first body portion extending along a first straight line, a plurality of first tooth portions configured to cut vegetation, a first connection assembly comprising a first driving portion connected with the transmission device to introduce a driving force output by the transmission device into the first blade, and a first connecting portion connected with the first body portion to make the first body portion move with the first driving portion,
the second blade comprises a second body portion extending along a second straight line, a plurality of second tooth portions configured to cut vegetation, a second connection assembly comprising a second driving portion connected with the transmission device to introduce a driving force output by the transmission device into the second blade, and a second connecting portion connected with the second body portion to make the second body portion move with the second driving portion,
the first connecting portion and the first body portion form a detachable connection, the second connecting portion and the second body portion form a detachable connection, a connection point between the first body portion and the first connecting portion is located outside the housing, and a connection point between the second body portion and the second connecting portion is located outside the housing,
wherein the blade assembly further comprises a support bar for supporting the first blade and a second blade, the hedge trimmer further comprises a stopper enabled to restrict the first body portion from being detached from the first connecting portion, and the stopper has a limiting state that restricts the first body portion from being detached from the first connecting portion and an unlocked state that allows the first body portion to be detached from the first connecting portion, and
wherein the support bar is arranged on an upper side of a whole composed of the first blade and the second blade, the stopper is arranged on a lower side of the whole composed of the first blade and the second blade, the support bar comprises a first portion located in the housing and a second portion located outside the housing, a length of the stopper is less than the support bar, the stopper comprises a third portion located in the housing and a forth portion located outside the housing, and the forth portion is configured to operate by a operator without opening the housing so that the stopper is switched between the limiting state and the unlocked state.

14. A hedge trimmer, comprising:
a blade assembly comprising a first blade and a second blade that perform a cutting function with a relative motion;
a housing formed with an accommodating cavity;
a prime mover arranged inside the accommodating cavity; and
a transmission device for realizing power transmission between the prime mover and the blade assembly to drive the first blade and the second blade to produce the relative motion,
wherein the first blade comprises a first body portion extending along a first straight line, a plurality of first tooth portions configured to cut vegetation, a first connection assembly comprising a first driving portion connected with the transmission device to introduce a driving force output by the transmission device into the first blade, and a first connecting portion connected with the first body portion to make the first body portion move with the first driving portion,
the second blade comprises a second body portion extending along a second straight line, a plurality of second tooth portions configured to cut vegetation, a second connection assembly comprising a second driving portion connected with the transmission device to introduce a driving force output by the transmission device into the second blade, and a second connecting portion connected with the second body portion to make the second body portion move with the second driving portion,
the first body portion and the first connecting portion form a detachable connection that is separable without opening the housing and the second connecting portion and the second body portion form a detachable connection,
wherein the blade assembly further comprises a support bar for supporting the first blade and a second blade, the hedge trimmer further comprises a stopper enabled to restrict the first body portion from being detached from the first connecting portion, and the stopper has a limiting state that restricts the first body portion from being detached from the first connecting portion and an unlocked state that allows the first body portion to be detached from the first connecting portion, and
wherein the support bar is arranged on an upper side of a whole composed of the first blade and the second blade, the stopper is arranged on a lower side of the whole composed of the first blade and the second blade, the support bar comprises a first portion located in the housing and a second portion located outside the housing, a length of the stopper is less than the support bar, the stopper comprises a third portion located in the housing and a forth portion located outside the housing, and the forth portion is configured to operate by a operator without opening the housing so that the stopper is switched between the limiting state and the unlocked state.

15. The hedge trimmer of claim 14, wherein in a direction perpendicular to the first straight line, the first blade is disposed on the lower side of the second blade, a minimum distance between the first body portion and the housing is greater than or equal to 0 and less than or equal to 300 mm, a minimum distance between the second body portion and the housing is greater than or equal to 0 and less than or equal to 300 mm, the first body portion is located outside the housing, and the second body portion is located outside the housing.

16. The hedge trimmer of claim 15, wherein a part of the first connecting portion is located outside the housing, another part of the first connecting portion extends into the housing, a part of the second connecting portion is located outside the housing, and another part of the second connecting portion extends into the housing.

17. The hedge trimmer of claim 14, wherein the stopper is a pressing plate for restricting the first body portion from being detached from the first connecting portion in a direction perpendicular to the first straight line, the pressing plate is fixed to the blade assembly through a first type of screw, the first type of screw is located outside the housing, and, when the first type of screw is removed, the pressing plate is detachable from the blade assembly by a user operating from an outside the housing without opening the housing.

18. The hedge trimmer of claim 14, wherein the housing comprises a body and a maintenance cover that are detachably connected together, when the maintenance cover is disassembled, an internal structure of the housing is at least partially exposed for replacement or maintenance, and the first body portion and the first connecting portion form a detachable connection that is separable without disassembling the maintenance cover.

* * * * *